(12) United States Patent
Murakami

(10) Patent No.: US 7,197,162 B2
(45) Date of Patent: Mar. 27, 2007

(54) IMAGE PROCESSING APPARATUS AND METHOD, COMPUTER PROGRAM, AND COMPUTER-READABLE STORAGE MEDIUM

(75) Inventor: Tomochika Murakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 779 days.

(21) Appl. No.: 10/600,582

(22) Filed: Jun. 23, 2003

(65) Prior Publication Data

US 2004/0001610 A1 Jan. 1, 2004

(30) Foreign Application Priority Data

Jun. 28, 2002 (JP) ............................. 2002-191126

(51) Int. Cl.
*G06K 9/00* (2006.01)
(52) U.S. Cl. ..................... 382/100; 382/168; 713/176
(58) Field of Classification Search ................ 382/100, 382/103, 107, 168, 173, 181, 232, 214, 194, 382/235, 243, 248, 269, 263, 274, 276, 305; 358/1.14; 713/176; 380/201

See application file for complete search history.

(56) References Cited

U.S. PATENT DOCUMENTS

| | | | |
|---|---|---|---|
| 6,233,347 B1 * | 5/2001 | Chen et al. | 382/100 |
| 6,738,493 B1 * | 5/2004 | Cox et al. | 382/100 |
| 6,975,746 B2 * | 12/2005 | Davis et al. | 382/100 |
| 6,996,248 B2 * | 2/2006 | Fudge et al. | 382/100 |
| 2001/0017709 A1 * | 8/2001 | Murakami et al. | 358/1.14 |
| 2002/0002679 A1 * | 1/2002 | Murakami et al. | 713/176 |

FOREIGN PATENT DOCUMENTS

| | | | |
|---|---|---|---|
| EP | 0 725 529 A2 * | 6/1996 | |
| JP | 8-241403 | 9/1996 | |
| JP | 8-256321 | 10/1996 | |
| JP | 2000-184173 | 6/2000 | |

\* cited by examiner

*Primary Examiner*—Kanjibhai Patel
*Assistant Examiner*—Seyed Azarian
(74) *Attorney, Agent, or Firm*—Fitzpatrick, Cella, Harper & Scinto

(57) ABSTRACT

This invention can multiplex noise in multilevel image data to reversibly embed visible additional information with a noise-multiplexed distribution while maintaining the atmosphere of the multilevel image data subjected to embedding. For this purpose, noise is multiplexed on multilevel image data containing a luminance component as a main component, thereby embedding visible additional information with a noise-multiplexed distribution. At this time, information representing whether or not to multiplex noise for each pixel is input as the additional information. Whether a pixel of interest in the multilevel image data is located at a position where noise is to be multiplexed is determined on the basis of the additional information (S806). When the pixel of interest is determined to be located at the position where noise is to be multiplexed, an embedding amount to be added to the position of the pixel of interest is calculated on the basis of data of a region near the pixel of interest (S810), and is added (S812).

34 Claims, 23 Drawing Sheets

FIG. 4A

| PIXEL VALUE | B7 | B6 | B5 | B4 | B3 | B2 | B1 | B0 | Δmax |
|---|---|---|---|---|---|---|---|---|---|
| 255 |  |  | Y | Y |  |  | Y |  | 50 |
| 254 |  |  | Y | Y |  |  | Y |  | 50 |
| ⋮ |  |  |  |  |  |  |  |  | ⋮ |
| 112 |  |  |  | Y | Y |  | Y |  | 26 |
| ⋮ |  |  |  |  |  |  |  |  | ⋮ |
| 1 |  |  |  |  |  |  | Y |  | 2 |
| 0 |  |  |  |  |  |  | Y |  | 2 |

401 NEIGHBORING REGION; 402 ARITHMETIC BIT REGION; 403

VISIBLE INTENSITY S = 1

FIG. 4B

| PIXEL VALUE | B7 | B6 | B5 | B4 | B3 | B2 | B1 | B0 | Δmax |
|---|---|---|---|---|---|---|---|---|---|
| 255 |  |  |  | Y | Y |  | Y |  | 26 |
| 254 |  |  |  | Y | Y |  | Y |  | 26 |
| ⋮ |  |  |  |  | ⋮ | ⋮ | ⋮ |  | ⋮ |
| 112 |  |  |  |  |  | Y | Y |  | 12 |
| ⋮ |  |  |  |  |  |  | ⋮ |  | ⋮ |
| 1 |  |  |  |  |  |  | Y |  | 2 |
| 0 |  |  |  |  |  |  | Y |  | 2 |

NEIGHBORING REGION; ARITHMETIC BIT REGION

VISIBLE INTENSITY S = 2

FIG. 12

| 0 | 0 | 0 | 0 | 0 | 0 | 0 | 0 |
|---|---|---|---|---|---|---|---|
| 0 | 0 | 1 | 1 | 1 | 1 | 0 | 0 |
| 0 | 1 | 2 | 2 | 2 | 2 | 1 | 0 |
| 0 | 1 | 2 | 3 | 3 | 2 | 1 | 0 |
| 0 | 1 | 2 | 3 | 3 | 2 | 1 | 0 |
| 0 | 1 | 2 | 2 | 2 | 2 | 1 | 0 |
| 0 | 0 | 1 | 1 | 1 | 1 | 0 | 0 |
| 0 | 0 | 0 | 0 | 0 | 0 | 0 | 0 |

F I G. 20
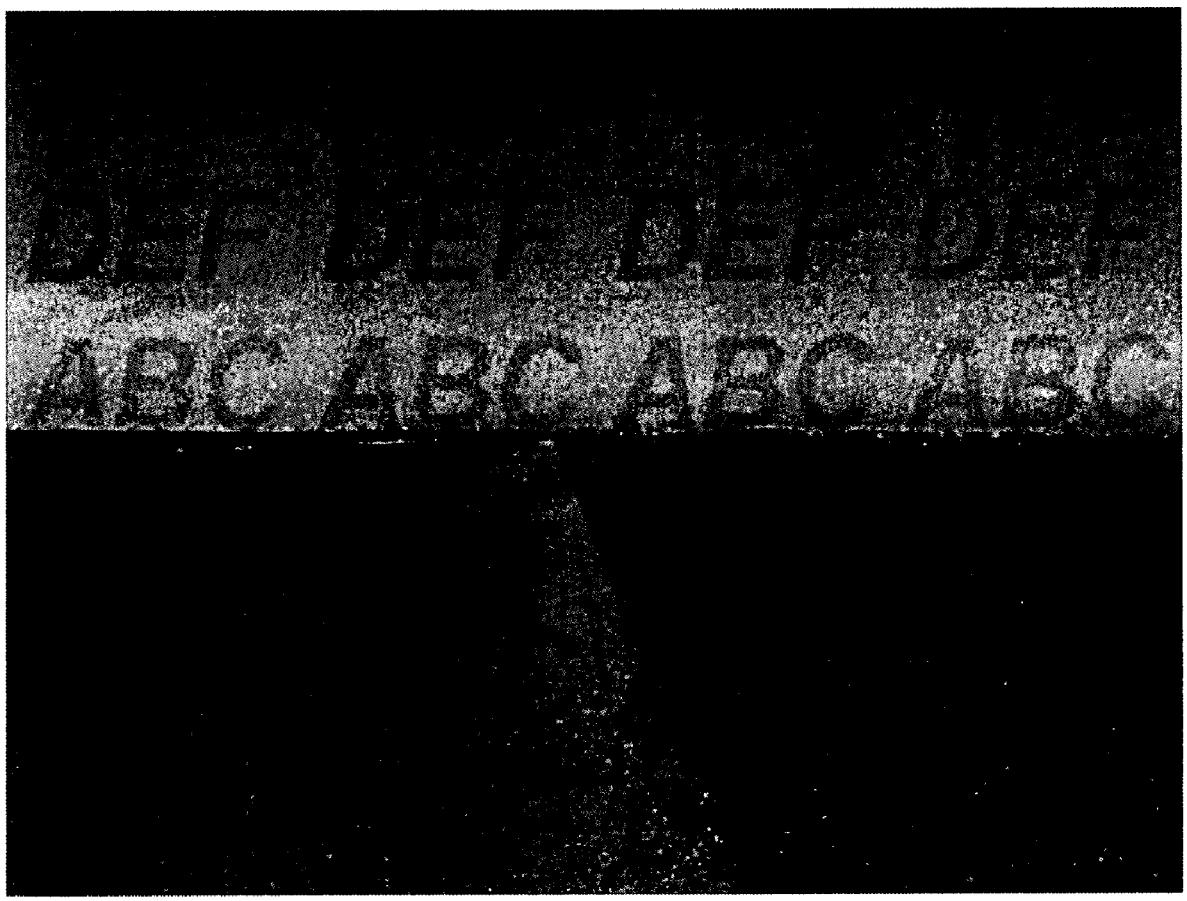

F I G. 22
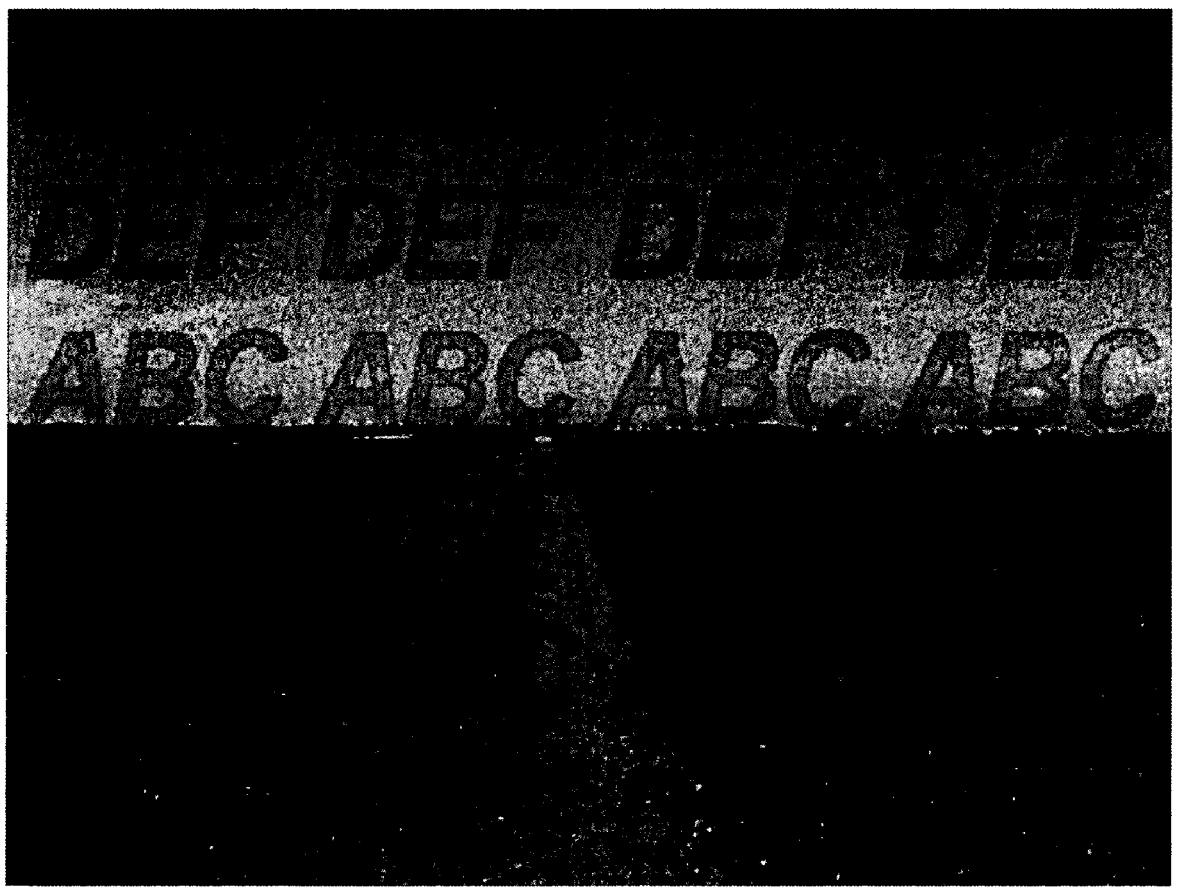

IMAGE PROCESSING APPARATUS AND METHOD, COMPUTER PROGRAM, AND COMPUTER-READABLE STORAGE MEDIUM

FIELD OF THE INVENTION

The present invention relates to an image processing apparatus and method which embed, in an image, visual secondary image shape information which can be visually checked, in order to protect the copyright of the image and prevent tampering of the image, a computer program, and a computer-readable storage medium.

BACKGROUND OF THE INVENTION

A digital image used to process an image as digital data can be easily copied by a computer or the like and transmitted via a communication line without degrading the image quality, compared to a conventional analog image. This feature, however, makes it easy to illicitly copy and redistribute a digital image having a copyright or the like.

To prevent this, there is known a digital watermark method. Digital watermarks are roughly classified into an invisible digital watermark obtained by invisibly embedding watermark information such as copyright information or user information, and a visible digital watermark obtained by positively visibly forming in an image a watermark image such as the logotype of a company having a copyright.

As for the invisible digital watermark, embedded watermark information cannot be recognized or is hardly recognized in an embedded image at a glance. Watermark information is rarely deleted, but is illicitly copied and distributed more frequently than visible watermark information. Even if a digital image is illicitly copied or distributed, watermark information remains in the digital image. An illicit user can be specified by a user ID or the like embedded as the watermark information.

As for the visible digital watermark, watermark information is visibly written in a digital image. It is difficult to directly utilize the digital image, suppressing illicit copying and illicit distribution. As a conventional visible digital watermark embedding method, the pixel value of an image representing copyright information such as the logotype of a copyright holder is replaced with the pixel value of an original image, embedding copyright information in the original image. The drawback of this method is that the original image cannot be reconstructed without difference information because the pixel value of the original image is lost.

In the conventional visible digital watermark embedding method, a replaced pixel value must be acquired again in reconstructing an original image. This substantially means reacquisition of the original image, increasing key information.

Japanese Patent Laid-Open No. 2000-184173 proposes a method of embedding visible watermark image shape information in an image by arithmetic processing (encryption) between all pixels or some bits and an embedding serial sequence at a position where a visible digital watermark is to be embedded. This method can implement a completely reversible visible digital watermark. However, this reference does not fully consider the image quality.

Japanese Patent Laid-Open No. 8-256321 proposes a method of extracting part of the bit string of an image which is compression-coded by JPEG or MPEG compression coding, directly converting the extracted bit string by an independently defined conversion method without referring to a part other than the extracted part, and decoding the image. This technique is called "semi-disclosure", and can provide image information to the user while controlling the image quality of the disclosed image information.

This method preserves the feature of an original image, but is a kind of scramble (encryption). This method does not fully consider the image quality of an image containing a digital watermark.

Japanese Patent Laid-Open No. 8-241403 proposes a visible digital watermark method which considers the image quality. In this reference, an input image is converted into a uniform color space. A linear luminance value is scaled in accordance with the watermark intensity (initial scale coefficient) or noise at a position where a visible digital watermark is to be embedded. As a result, the luminance is increased/decreased to embed a visible digital watermark. This reference will achieve good image quality, but does not describe any method of an implementing a completely reversible watermark.

SUMMARY OF THE INVENTION

The present invention has been made to overcome the conventional drawbacks, and has as its object to provide an image processing apparatus and method which multiplex reversible noise on an original image to embed visible additional information, satisfactorily reflect the feature of the original image even on the noise-multiplexed portion, and multiplex natural additional information, a computer program, and a computer-readable storage medium.

It is another object of the present invention to provide an image processing apparatus and method capable of removing additional information to reconstruct an original image or an image almost identical to the original image, a computer program, and a computer-readable storage medium.

To achieve the above objects, an image processing apparatus according to the present invention has the following arrangement.

That is, an image processing apparatus which multiplexes noise on multilevel image data containing at least a luminance component as a main component, thereby embedding visible additional information with a noise-multiplexed distribution comprises input means for inputting, as the additional information, information representing whether or not to multiplex noise for each pixel, determination means for determining on the basis of the additional information whether a pixel of interest in the multilevel image data is located at a position where noise is to be multiplexed, luminance value calculation means for, when the determination means determines that the pixel of interest is located at the position where noise is to be multiplexed, calculating an addition luminance value to be added to the pixel of interest on the basis of a luminance value of a neighboring region near the pixel of interest, and addition means for adding the calculated addition luminance value to a luminance value of the pixel of interest.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A and 4B are tables showing examples of an arithmetic bit region determination table according to the first embodiment;

FIG. 12 is a view showing an example of watermark image shape information according to the third embodiment;

FIG. 20 is a view showing a sample image in which a visible digital watermark is embedded by the method of the second embodiment;

FIG. 22 is a view showing a sample image in which a visible digital watermark is embedded by the method of the fourth embodiment.

DETAILED DESCRIPTION OF THE PREFERRED EMBODIMENTS

Preferred embodiments of the present invention will be described below with reference to the accompanying drawings.

<Description of Premise>

In the following embodiments, a component used to embed a visible digital watermark is a luminance component which constitutes a color image. Since the color component does not change upon operating the luminance component, the brightness seems to have changed to the human eye. Hence, the luminance component is suitable for embedding a visible digital watermark.

However, a component used to embed a visible digital watermark is not limited to a luminance component. R (Red), G (Green), and B (Blue) components can also be operated with good balance such that a visible digital watermark seems preferable to the human eye while preserving the feature of the image. This also applies to other components (e.g., C (Cyan), M (Magenta), and Y (Yellow)).

For descriptive convenience, an input image is an 8-bit grayscale image. An image comprised of R (Red), G (Green), and B (Blue) color components, or an image comprised of Y (Luminance) and U and V (two color difference components) color components can also be processed by a method according to the embodiments of the present invention.

Figure 17:
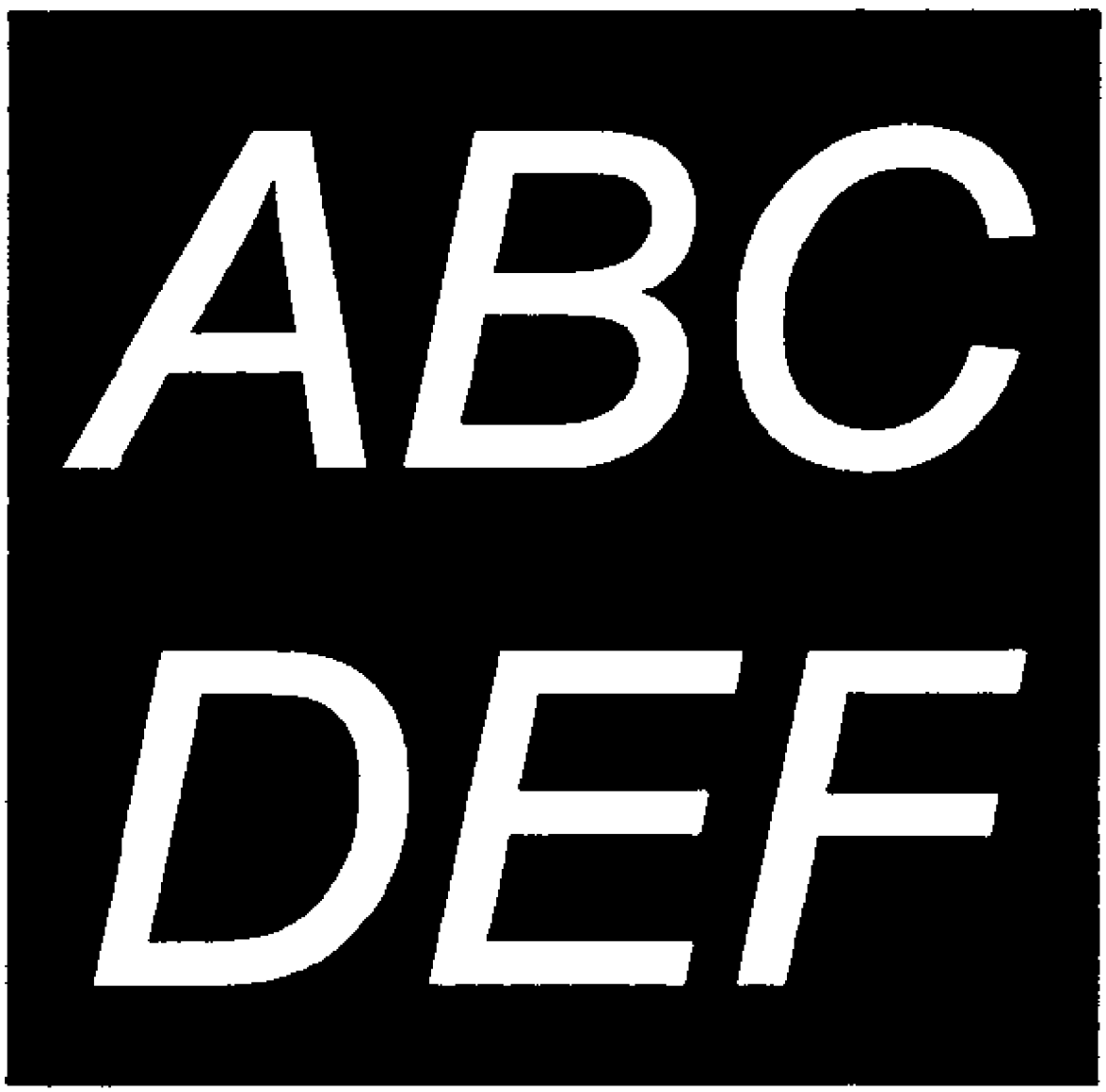
FIG. 17 is a view showing an example of image shape information for embedding a visible digital watermark in the embodiment.

FIG. 17 shows an example of watermark image shape information representing a visible digital watermark embedded in an image in the embodiments. FIG. 17 illustrates a simple character string "ABC, DEF". Watermark image shape information can be any image information such as the logotype of a copyright holder, an image photographing date and time, a personal name, a company name, a logotype, or an impressive pattern. Watermark image shape information may be a region of interest (e.g., a morbid portion of a medical image) in an image.

In the present invention, as shown in FIG. 17, watermark image shape information is a mask image having information of 1-bit pixels (binary) which defines a position where watermark processing (in the embodiments, noise is added or multiplexed) is performed (in FIG. 17, a white alphabet region represents a region where a visible digital watermark is embedded).

First Embodiment

The first embodiment of the present invention will be described below with reference to the accompanying drawings.

Figure 23:
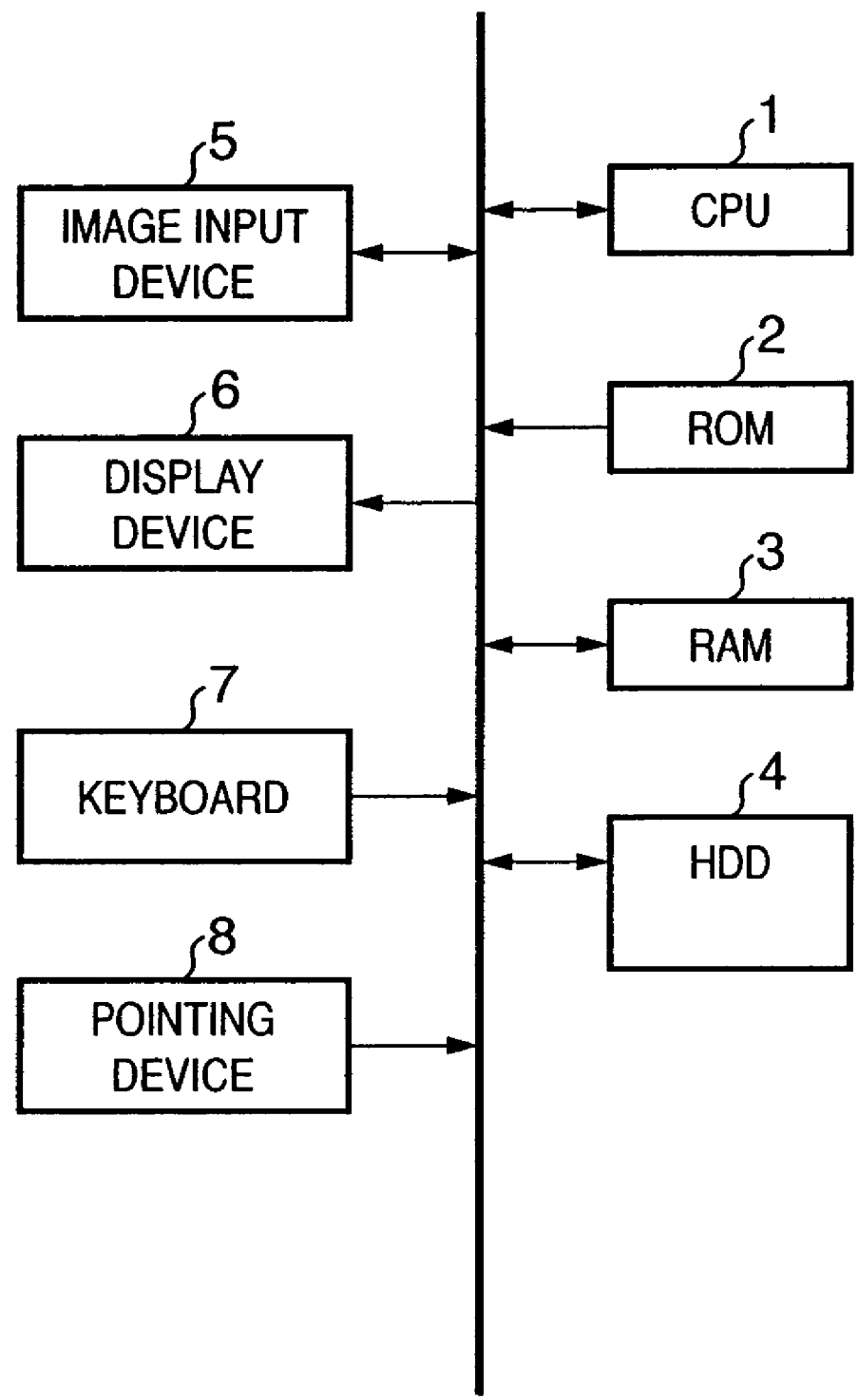
FIG. 23 is a block diagram showing an apparatus according to the embodiment.

FIG. 23 is a block diagram showing an information processing apparatus which processes an image in the first embodiment. In FIG. 23, reference numeral 1 denotes a CPU which controls the whole apparatus; 2, a ROM which stores a boot program, BIOS, and the like; and 3, a RAM used as a work area for the CPU 1. An OS, image processing program, or the like is loaded to the RAM 3 and executed. Reference numeral 4 denotes a hard disk device serving as an external storage device for storing an OS, image processing program, and image data files (including files before and after processing); 5, an image input device such as an image scanner, a digital camera, a storage medium (memory card, flexible disk, CD-ROM, or the like) which stores an image file, or an interface for downloading an image from a network; 6, a display device which displays an image and provides GUI for performing various operations; 7, a keyboard; and 8, a pointing device used to designate a desired position on a display screen and select various menus.

The apparatus having the above arrangement is powered on, and the OS is loaded to the RAM 3. An image processing program in the first embodiment is loaded to the RAM 3 and executed in accordance with a user instruction or automatic activation setting.

Figure 1:
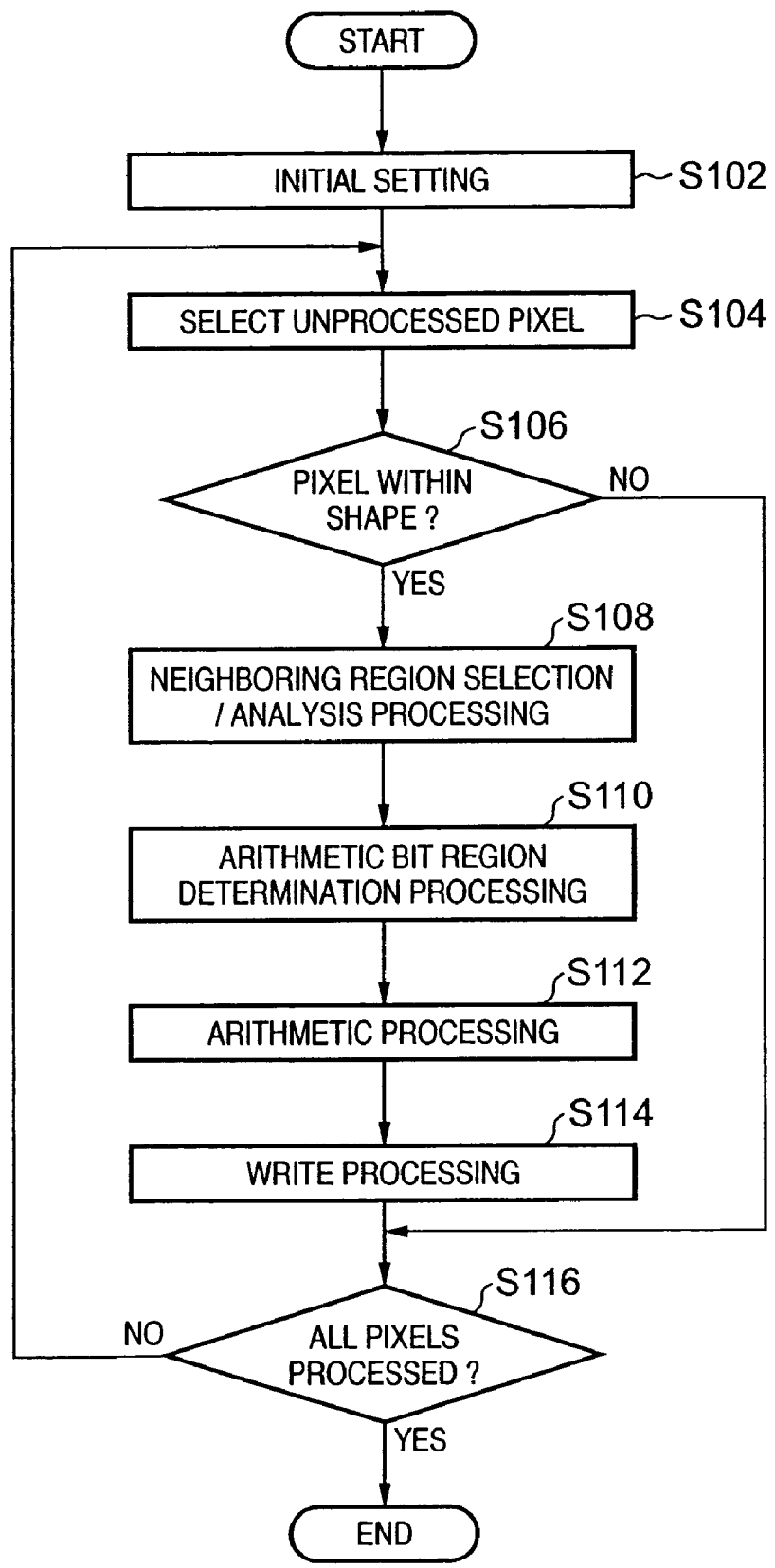
FIG. 1 is a flow chart showing the procedures of visible digital watermark embedding processing according to the first embodiment.

FIG. 1 is a flow chart showing processing of a reversible noise addition apparatus according to the first embodiment of the present invention.

In the initial state in step S102 of FIG. 1, an original image I comprised of a plurality of pixels each having a pixel position and pixel value, watermark image shape information M comprised of a pixel position representing the shape of an embedded image, a random number key R for generating a predetermined serial bit sequence expressed by binary numbers, an arithmetic bit region determination table T_N which defines a bit region subjected to arithmetic processing among pixel values, a visible intensity value S which defines the intensity of noise to be added, a neighboring pixel selection method NS, and a neighboring pixel analysis method NA are set. The storage area of an output image W is ensured in the RAM.

The original image I may be an image directly input from the image input device 5 or an image file temporarily saved in the HDD 4. The image shape information M is information stored in the HDD 4 in advance, but may be freely created by the user. As for the random number key R, a function (program) for generating a random number may be executed. The arithmetic bit region determination table T and visible intensity value S may be input from the keyboard or the like, or may be saved as a file in the HDD in advance. The output destination of the output image W is the HDD 4. The serial bit sequence may be fixed for the entire image, but is changed in accordance with the image embedding position on the basis of the random number key R in order to enhance security.

In step S102, specific pixels in the original image I are sequentially selected prior to the following processing. As the selection order, the upper left corner is set as the start position, and one horizontal line is scanned right from the start position. At the end of the line, the next line (second line) is scanned from left to right. This scanning is repeated. This also applies to noise removal and the following embodiments.

In step S104, an unprocessed pixel is selected from the input image (in the initial state, the upper left corner). In step S106, a position in watermark image shape information that corresponds to the selected pixel position in the original image, i.e., whether the pixel position is position "1" in image shape information (in this embodiment, a watermark image is embedded at a white pixel position, as described above) is determined. If the current pixel is a pixel subjected to embedding (multiplexing), the pixel position information is transferred to step S108. If the current pixel is located at a position other than "1" in the image shape information, i.e., at position "0", processing for the pixel ends.

Processing advances to step S108 to determine a region near the embedding target pixel on the basis of the initially set neighboring region selection method NS. The pixel value in the neighboring region is analyzed in accordance with the initially set neighboring analysis method NA, generating a neighboring region analysis value. The neighboring region analysis value is comprised of a neighboring region pixel value serving as the predicted value of the embedding target pixel that is obtained from the neighboring region, and a neighboring region characteristic value containing the frequency characteristic of the neighboring region and the like (which will be described in detail later).

In step S110, an arithmetic bit region to be processed by arithmetic processing in step S112 is determined on the basis of the neighboring region analysis value generated in step S108 and the visible intensity value S.

In step S112, arithmetic processing is performed between the bit of the arithmetic bit region determined in step S110 and a serial bit sequence generated from the random number key R input by initial setting in step S102. This arithmetic processing must be reversible. As arithmetic processing, the first embodiment adopts exclusive-OR calculation. Arithmetic processing includes all reversible arithmetic processes such as modulo addition and modulo multiplication.

In step S114, write processing of writing the value of the bit region of a corresponding input pixel in the output image W by the value of the processed arithmetic bit region is executed.

In step S116, whether all pixels have been processed is determined. If NO in step S116, processing returns to step S104 to continue the above-described processing until all pixels have been processed.

The outline of reversible noise addition processing according to the first embodiment has been described.

Figure 2:
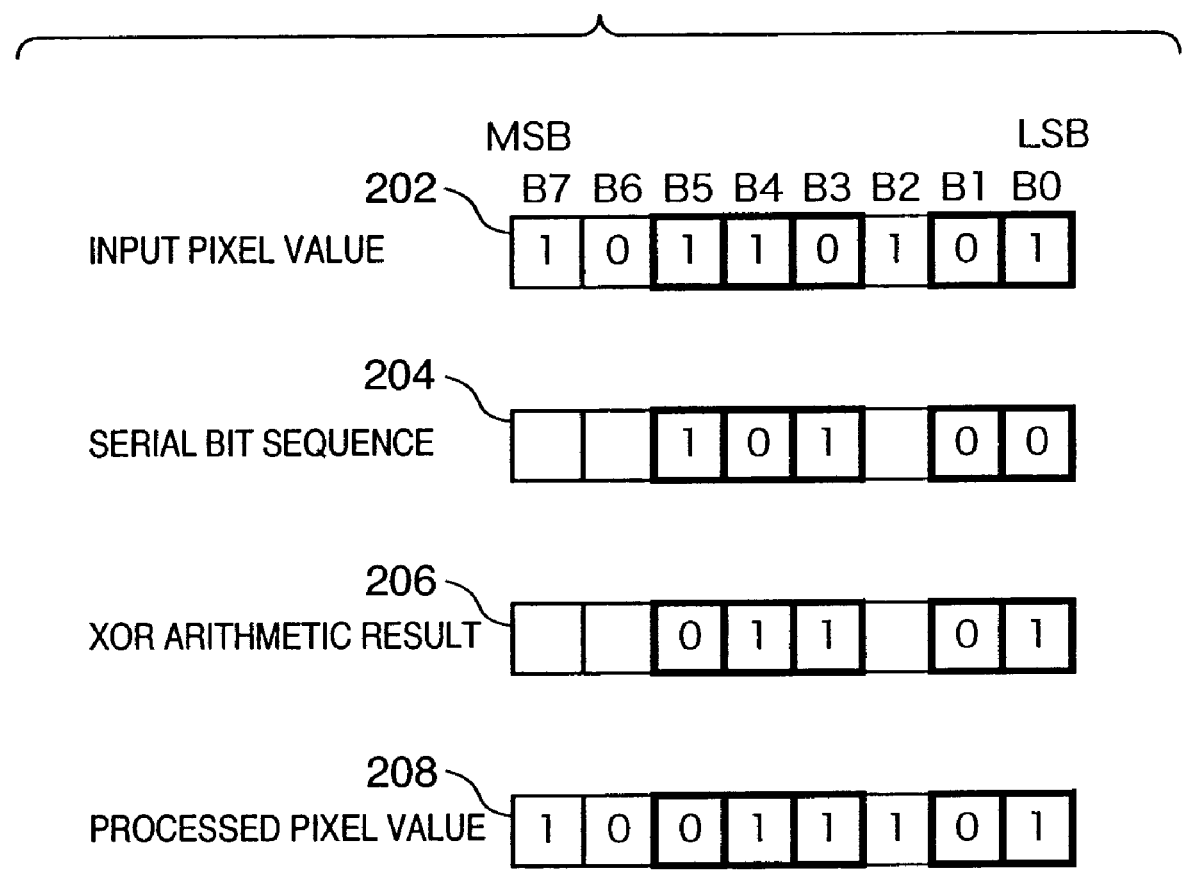
FIG. 2 is a view showing arithmetic processing contents.

FIG. 2 shows an example of operation in arithmetic processing. Reference numeral 202 denotes an input pixel value; 204, a serial bit sequence generated from the random number key R; 206, an exclusive-OR (XOR) of an input pixel and a corresponding bit position in a serial bit sequence; and 208, an output pixel having undergone arithmetic processing. A bit position surrounded by a thick frame is an arithmetic bit region.

The serial bit sequence 204 also serves as a key for decoding a pixel. A serial bit sequence corresponding to a region other than the arithmetic bit region is not required.

A value in the thick frame in the exclusive-OR 206 is the arithmetic processing result (in this case, exclusive-OR) of the arithmetic bit region of an input pixel and the bit region of a corresponding serial bit sequence.

The output pixel 208 is a result of writing the arithmetic processing result 206 as the value of the arithmetic bit region of a corresponding input pixel.

In FIG. 2, the difference between the pixel value of the arithmetic result and the original pixel value (B means a binary number in the following description) is $$10011101(B) - 10110101(B) = 157 - 181 = -24$$

This means that the pixel value of interest has changed by "−24".

When 5 bits B5, B4, B3, B1, and B0 (it should be noted that B2 is excluded) form an arithmetic bit region and the entire arithmetic bit region is inverted, a pixel value change of $2^5+2^4+2^3+2^1+2^0=32+16+8+2+1=59$ ($x^y$ represents the yth power of x) is realized at maximum.

In this manner, the arithmetic bit region determines the maximum change amount (Δmax) of the pixel value of an embedding target pixel. In the first embodiment, bit information belonging to the arithmetic bit region is processed to embed reversible noise. The arithmetic bit region is an element which determines the intensity of added reversible noise. In the first embodiment, the arithmetic bit region is determined on the basis of analysis of a neighboring region comprised of one or a plurality of pixel values near an embedding target pixel.

Neighboring region analysis processing and a neighboring region analysis value will be explained in detail.

In the first embodiment, an arithmetic bit region subjected to arithmetic processing is determined on the basis of analysis of a neighboring region comprised of adjacent pixel values or the like in order to embed a visible digital watermark in an embedding target pixel.

Generally in a natural image, the pixel values of adjacent pixels have a high correlation. That is, adjacent pixel positions often have almost the same pixel value. In a natural image, a change amount between neighboring pixels that can be perceived by the human eye is proper as a change amount of an embedding target pixel that can be perceived by the human eye.

The human visual characteristic to luminance is nonlinear such that a change in luminance is hardly perceived at a high luminance and easily perceived at a low luminance.

In the first embodiment, the maximum change amount $\Delta max$ of an embedding target pixel is finely set by referring to a neighboring pixel highly correlated to the embedding target pixel and considering the human visual characteristic. Addition of noise which is perceived almost similarly at any grayscale (luminance) of an original image is realized.

A region constituted by neighboring pixels which determine an arithmetic bit region for embedding reversible noise in an embedding target pixel will be called a "neighboring region".

The neighboring region may be constituted by one or a plurality of pixels. The neighboring region suffices to be a region predicted to have a high correlation with an embedding target pixel, and need not always be adjacent to the embedding target pixel.

Analysis of the pixel in the neighboring region may utilize not only a pixel value but also a statistical characteristic such as the frequency characteristic of a pixel value in the neighboring region or the variance of a pixel value in the neighboring region.

The arithmetic region determination table T_N in which the maximum change amount $\Delta max$ is set large at a high-frequency portion or in a texture region may be designed. In this case, reversible noise which can be easily, uniformly recognized by the human eye even in the high-frequency-component region or texture region can be added.

Neighboring region selection/analysis processing according to the first embodiment will be explained in detail.

Figure 5:
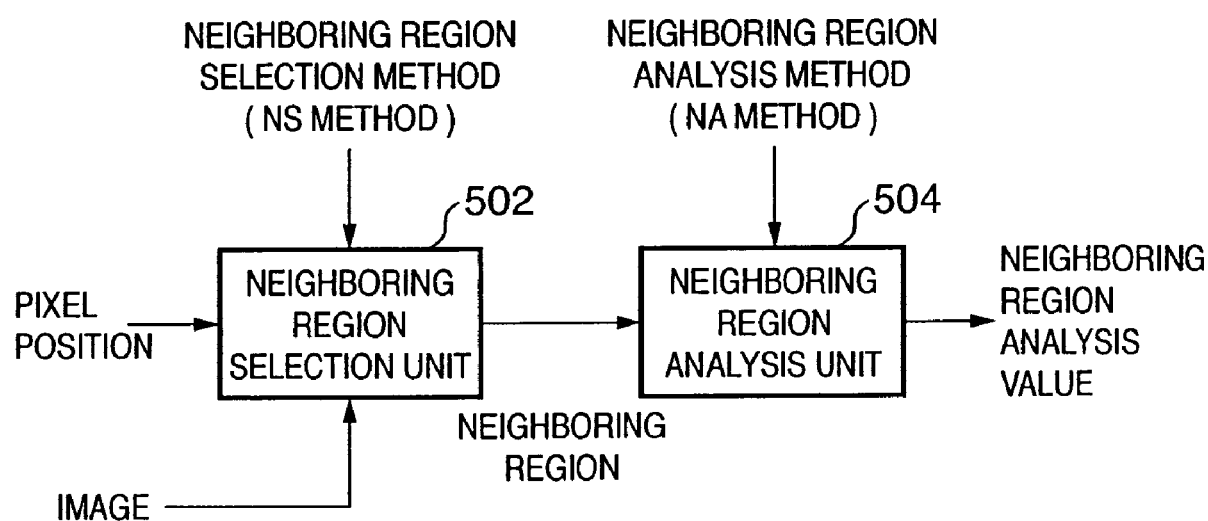
FIG. 5 is a block diagram showing the internal arrangement of a neighboring region selection/analysis unit which executes neighboring region selection/analysis processing.

FIG. 5 is a block diagram showing the internal arrangement of a neighboring region selection/analysis unit which executes neighboring region selection/analysis processing in step S108 of FIG. 1. The neighboring region selection/analysis unit comprises a neighboring region selection unit 502 and neighboring region analysis unit 504.

The neighboring region selection unit 502 receives image information (pixel position and pixel value), position information of an embedding target pixel, and the neighboring region selection method NS. The neighboring region selection unit 502 determines a neighboring region on the basis of the pieces of input information. The neighboring region may not be fixed in the entire image, but may be changed in accordance with the pixel position or predetermined key information.

The neighboring region selection unit 502 outputs neighboring region information (pixel position, pixel value, and the like) to the neighboring region analysis unit 504 on the output stage.

The neighboring region analysis unit 504 receives the neighboring region information (pixel position, pixel value, and the like) and the neighboring region analysis method NA, and analyzes the pixel value of the neighboring region on the basis of the pieces of input information. The neighboring region analysis unit 504 outputs a neighboring region analysis value (neighboring region pixel value and neighboring region characteristic value).

Processing of the neighboring region selection/analysis means will be described in detail with reference to FIG. 6.

Figure 6:
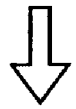
FIG. 6 is a view showing correspondence between an input image and a multiplexed image according to the first embodiment.

FIG. 6 is a view showing part of an 8-bit grayscale input image 601 and an output image 602 (noise-added image) containing a visible digital watermark.

Pixels (pixels 13a, 14a, 15a, 18a, 19a, and 20a) surrounded by thick frames in FIG. 6 fall within the watermark image shape ("1" region), and are pixels subjected to reversible noise embedding.

In the first embodiment, the arithmetic bit region of the pixel 13a is selected on the basis of a region near the pixel 13a. The neighboring region is determined using the neighboring region selection unit 502.

For descriptive convenience, the neighboring region selection unit 502 in the first embodiment selects a pixel left to a pixel of interest. When the pixel 13a is a pixel of interest subjected to noise addition processing, a left adjacent pixel 12a (pixel value "112") is selected as a neighboring region. Selection of a plurality of pixel regions as neighboring regions will be described later.

The pixel 12a (pixel value "112") is input to the neighboring region analysis unit 504. In FIG. 6, for descriptive convenience, the neighboring region analysis unit 504 directly outputs the input pixel value "112" as a neighboring region analysis value.

In arithmetic bit region determination processing, the arithmetic bit region of the embedding target pixel 13a is determined on the basis of the neighboring region analysis value obtained by the preceding neighboring region selection/analysis processing.

The first embodiment determines an arithmetic bit region as follows.

Figure 3:
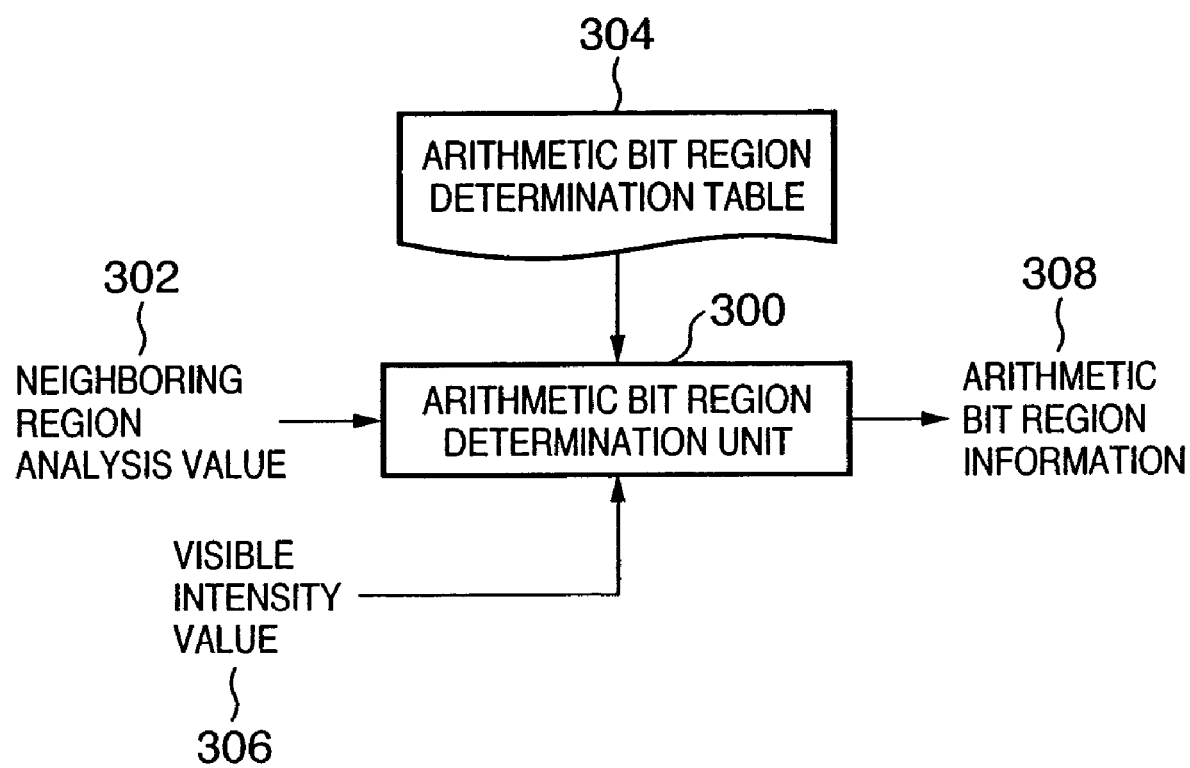
FIG. 3 is a block diagram showing the internal arrangement of an arithmetic bit region determination unit which executes arithmetic bit region determination processing.

FIG. 3 is a block diagram showing an arithmetic bit region determination unit which executes arithmetic bit region determination processing in step S110.

An arithmetic bit region determination unit 300 receives a neighboring region analysis value 302 input from neighboring region selection/analysis processing in step S108, an initially set visible intensity value S (306), and an arithmetic bit region determination table T_N 304.

The arithmetic bit region determination unit 300 determines the arithmetic bit region of an embedding target pixel on the basis of the neighboring region analysis value 302, arithmetic bit region determination table T_N 304, and visible intensity value S 306, and outputs the arithmetic bit region as arithmetic bit region information 308.

The arithmetic bit region determination table T_N will be explained.

The arithmetic bit region determination table T_N is a lookup table used to determine an arithmetic bit region by arithmetic bit region determination processing in step S110.

FIGS. 4A and 4B show examples of the arithmetic bit region determination table T_N which corresponds to the neighboring region analysis value (the pixel value of the pixel in the neighboring region). FIG. 4A shows a table for the visible intensity S=1, and FIG. 4B shows a table for the visible intensity S=2. As the value (luminance) in the neighboring pixel region is smaller, the arithmetic bit region at a pixel of interest shifts to a lower bit. This is because, in a natural image (grayscale image obtained by a digital camera or scanner), the correlation between a pixel of interest and a neighboring pixel is high, in other words, the pixel of interest and neighboring pixel have almost the same luminance, and the human visual characteristic to luminance is nonlinear such that a change in luminance is hardly perceived at a high luminance and easily perceived at a low luminance.

In FIGS. 4A and 4B, reference numeral 401 denotes a neighboring region analysis value (FIGS. 4A and 4B show only a neighboring region pixel value for descriptive convenience); 402, an arithmetic bit region of an embedding target pixel that corresponds to the neighboring region analysis value (in FIGS. 4A and 4B, a bit position "Y" is an arithmetic bit region); and 403, a maximum change amount Δmax calculated from the arithmetic bit region. A bit having no "Y" is not changed.

As shown in FIGS. 4A and 4B, the arithmetic bit region shifts downward as a bit position for the visible intensity S=2 with respect to the visible intensity S=1. This means that the original image is less changed for the visible intensity S=2, i.e., degradation of the image quality of the original image is suppressed.

As described above, in the arithmetic bit region determination table T_N, the neighboring region analysis value (in FIGS. 4A and 4B, the neighboring region pixel value calculated from the neighboring region) and the visible intensity value S have values which correspond to the arithmetic bit region. The arithmetic bit region determination unit 300 selects either arithmetic bit region determination table in accordance with the visible intensity S. The arithmetic bit region determination unit 300 looks up the selected arithmetic bit region determination table T_N, and reads and outputs an arithmetic bit region which corresponds to the input neighboring region analysis value 302 and visible intensity value S306.

In arithmetic processing of step S112, bit calculation is executed between a serial bit sequence as shown in FIG. 2 and the bit of the arithmetic bit region in the arithmetic bit region determined by the above-described method. In write processing of step S114, the arithmetic result in step S112 is written in a corresponding arithmetic bit region of an output image.

Figure 7:
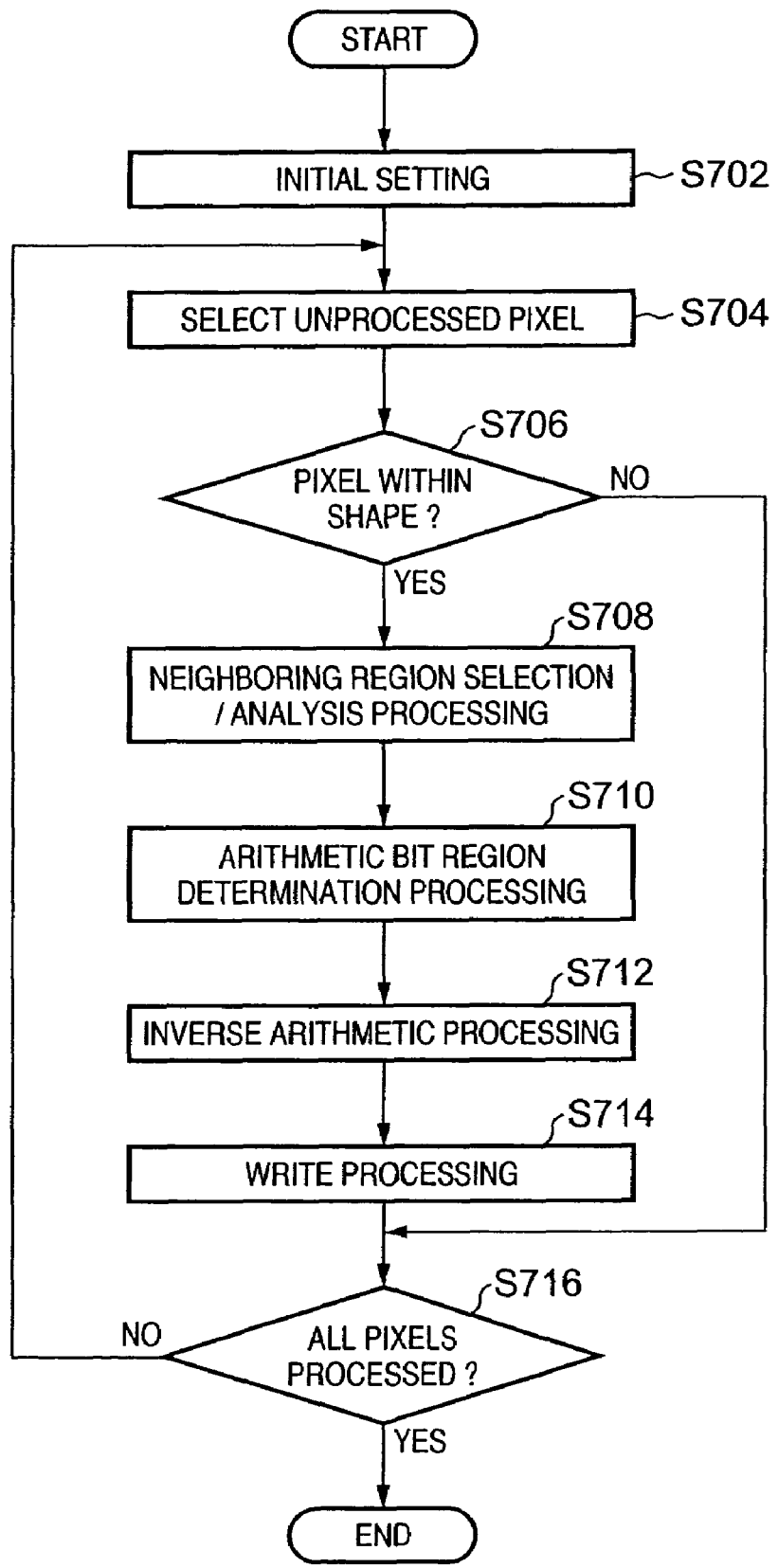
FIG. 7 is a flow chart showing visible digital watermark removal processing according to the first embodiment.

The outline of reversible noise removal processing according to the first embodiment will be briefly described with reference to FIG. 7. The apparatus arrangement is substantially the same as that of the apparatus which embeds noise, and a detailed description thereof will be omitted.

In initial setting of step S702, a reversible noise-embedded image W comprised of a plurality of pixels each having a pixel position and pixel value, watermark image shape information M comprised of a pixel position representing the shape of an embedded image, a random number key R for generating a predetermined serial bit sequence expressed by binary numbers, an arithmetic bit region determination table T_N which defines a bit region subjected to arithmetic processing among pixel values, and a visible intensity value S which defines the intensity of a visible digital watermark are input. An output image E is so set as to be identical to the input image W (a copy of the input image W is generated and used as the output image E).

The watermark image shape information M, random number key R, arithmetic bit region determination table T_N, and visible intensity value S are used as key information for removing reversible noise.

In step S704, an unprocessed pixel of the input image is selected.

In step S706, whether noise is multiplexed on the selected pixel is determined on the basis of the pixel position in image shape information (position "0" or "1"). If NO in step S706, processing for the pixel ends.

If YES in step S706, processing advances to step S708 to determine a region (left adjacent pixel in the first embodiment) near the embedding target pixel on the basis of the initially set neighboring region selection method NS. The pixel value in the neighboring region is analyzed in accordance with the initially set neighboring analysis method NA, generating a neighboring region analysis value.

In step S710, an arithmetic bit region to be processed by arithmetic processing in step S712 is determined on the basis of the neighboring region analysis value generated in step S708 and the visible intensity value S. For example, for the visible intensity value S=1, the table in FIG. 4A is looked up, and the arithmetic bit region of a pixel of interest can be obtained on the basis of the pixel value in the neighboring region (left adjacent pixel).

In step S712, inverse arithmetic processing is performed between the bit of the arithmetic bit region that is determined in step S710 and a serial bit sequence generated from the random number key R input by initial setting in step S702. This arithmetic processing is inverse arithmetic processing (decoding processing) corresponding to arithmetic processing in embedding. In the first embodiment, an exclusive-OR is calculated for the arithmetic bit region by using the same serial bit as that used in embedding. As a result, the pixel value can be completely restored to an original pixel value.

In step S714, write processing of writing, in a corresponding pixel of the output image E, the arithmetic bit region value obtained by processing the bit region value of the input pixel is executed.

In step S716, whether all pixels have been processed is determined. If NO in step S716, processing returns to step S704 to continue the above-described processing until all pixels have been processed.

The operation of the reversible noise removal apparatus according to the first embodiment has been described.

The processing contents of the first embodiment have been described, and a concrete example will be explained for easy understanding of the processing contents.

To realize addition of completely reversible noise, several conditions are necessary for the neighboring region selection method. That is, in inverse arithmetic processing, an arithmetic bit region having undergone arithmetic processing in embedding must be correctly recognized. The neighboring region selection method must select a neighboring region so as to refer to the pixel value of a neighboring region used to determine an arithmetic bit region in inverse arithmetic processing (removal of reversible noise).

There are many neighboring region selection methods which satisfy the above conditions. For example, a pixel left adjacent to an embedding target pixel is referred to as a neighboring region, and reversible noise is added/removed to/from the pixel of interest. When the pixel left adjacent to the pixel of interest is used as a neighboring region, the neighboring region must be completely reconstructed to an original image. This can also be achieved by many methods. According to one method, the leftmost vertical line of image shape information is changed to "0", in other words, is excluded from the noise embedding target. As a result, the start pixel remains original and satisfactorily functions as a neighboring region in noise removal of each line in the left-to-right direction. According to another method, when the start pixel of each line is permitted to be a noise multiplexing target, no neighboring region exists, and the arithmetic bit region is fixed.

Embedding will be briefly explained. In FIG. 6, the visible intensity S=1 is set, and the pixel 13a is determined to be an embedding target pixel. At this time, the left adjacent pixel 12a (pixel value "112") is selected and analyzed as a neighboring region. As a result, "112" is output as the neighboring region pixel value of the neighboring region analysis value.

The arithmetic bit region of the pixel 13a is determined using the determined arithmetic bit region determination table T_N (table in FIG. 4A because of the visible intensity S=1). Since the neighboring region value is "112", B4, B3, and B1 in the pixel 13a are determined as arithmetic bits.

A pixel value "126" is calculated for the pixel 13a (pixel value "116") by arithmetic processing (exclusive-OR) between the bit values in the arithmetic bit region of the pixel 13a and the serial bit sequence. The pixel value "126" is written in the pixel 13a of the output image 602.

The processing target shifts to the pixel 14a. At this time, the arithmetic bit region of the pixel 14a is determined using the arithmetic bit region determination table T_N by referring to the left adjacent pixel 13a (pixel value "116" before change) of the input image 601. A pixel value "98" is calculated for the pixel 14a (pixel value "114") by arithmetic processing between the arithmetic bit region and a serial bit sequence. The pixel value "98" is written in the pixel 14a of the output image 602.

The pixel values of left adjacent pixels before change are sequentially read out to embed reversible noise.

A step of removing reversible noise embedded in the above-described way will be explained. In removing noise, pieces of necessary information such as a noise-multiplexed image, visible intensity, image shape information, and random number key have already been input, as described above.

A case wherein the pixel 13a (pixel value "126") is a removal target pixel will be explained. It should be noted that reconstruction processing has been completed up to a left adjacent pixel position.

The left adjacent reconstructed pixel 12a (pixel value "112") of the output image 602 is selected and analyzed as a neighboring region. As a result, "112" is output as the neighboring region pixel value of the neighboring region analysis value.

The arithmetic bit region of the pixel 13a is determined using the arithmetic bit region determination table T_N (selected by the visible intensity S). A restored pixel value "116" is calculated for the pixel 13a (pixel value "126" after watermark embedding) by arithmetic processing between the bit value of the arithmetic bit region and a serial bit sequence. The pixel value "116" is written in the pixel 13a of the output image 601 (original image).

The removal target pixel shifts to the pixel 14a. In this case, not the left adjacent pixel 13a of the input image 601 but the left adjacent reconstructed pixel 13a (restored pixel value "116") in the reconstructed output image 602 is selected and analyzed. As a result, "116" is output as the neighboring region pixel value of the neighboring region analysis value.

The arithmetic bit region of the pixel 14a is determined using the arithmetic bit region determination table T_N. A pixel value "114" is calculated for the pixel 14a (pixel value "98") by arithmetic processing between the bit value of the arithmetic bit region and the serial bit sequence. The pixel value "114" is written in the pixel 14a of the output image 602 (original image).

The pixel values of adjacent reconstructed pixels are sequentially selected and analyzed to determine the same arithmetic bit region as that in embedding, completely removing reversible noise.

In the above description, a pixel left adjacent to an embedding target pixel is selected as a neighboring region for descriptive convenience. Alternatively, a pixel on an immediately preceding line at the same position in the main scanning direction may be selected as a neighboring region. In short, a reconstructed pixel is referred to.

Instead of using one pixel as a reference region, a region of a plurality of pixels may be selected and analyzed as a neighboring region.

For example, in FIG. 6, the neighboring region selection unit selects the pixels 7a, 8a, and 12a as a region near the pixel 13a of interest. The neighboring region analysis unit predicts the pixel value of the embedding target pixel 13a from the pixel values of the pixels 7a, 8a, and 12a, and sets the predicted value as a neighboring region pixel value.

Alternatively, the neighboring region selection unit may select four left pixels 1a, 2a, 6a, and 7a as a region near the pixel 13a. In this case, the neighboring region analysis means may also calculate a variance, frequency coefficient, and the like in the neighboring region, and set them as neighboring region characteristic values. An arithmetic bit region corresponding to the variance, frequency coefficient, and the like is defined in the arithmetic bit region determination table T_N.

In the arithmetic bit region determination table T_N in FIG. 4A (for the visible intensity S=1), the arithmetic bit region corresponding to an input pixel value "112" as a neighboring region analysis value (neighboring region pixel value) is defined by B4, B3, and B1. At this time, the maximum change amount (Δmax) is calculated into 2^4+2^3+2^1=26 (x^y represents the yth power of x). For example, when the pixel value of an embedding target pixel is 112, B4, B3, and B1 of 112 are 1, 0, and 0. The change amount has a width of 2^3+2^1=10 in the positive direction and 2^4=16 in the negative direction.

The reversible noise addition method of the first embodiment can finely set an arithmetic bit region on the basis of a neighboring region pixel value almost equal to the value of an embedding target pixel and a neighboring region analysis value obtained from a neighboring region characteristic value near the embedding target pixel.

Addition of reversible noise to all the pixels of an input image by using the reversible noise addition apparatus of the first embodiment will be described. When a pixel near the edge of an input image is selected as an embedding target pixel, no neighboring region may exist. Several examples of a method coping with the absence of any neighboring region will be explained.

For example, when a pixel having no neighboring region near the edge of an input image is an embedding target pixel, addition of reversible noise may stop, as described above. In removing reversible noise from the pixel having no neighboring region, it is known that no reversible noise is added. Removal of reversible noise need not be executed until the neighboring region is obtained.

When a pixel having no neighboring region near the edge of an input image is an embedding target pixel, arithmetic bit processing may be done for a fixed arithmetic bit region determined only in accordance with the visible intensity value S. In removing reversible noise from the pixel having no neighboring region, inverse arithmetic processing is performed for the arithmetic bit region determined only in accordance with the visible intensity value S, thereby removing reversible noise.

As described in detail above, an arithmetic bit region is determined in accordance with the neighboring region analysis value for the pixel value of an input image which attains the size of a neighboring region determined by the neighboring region selection method NS.

As also described above, the human visual characteristic is more sensitive to a change in luminance value at a lower luminance value and less sensitive to a change in luminance value at a higher luminance value. The arithmetic bit region (maximum change amount $\Delta$max) is preferably designed in consideration of the human visual characteristic. From this viewpoint, according to the first embodiment, the arithmetic bit reaches a high bit position for a high-luminance neighboring region, and the arithmetic bit region is comprised of a low bit for a low-luminance neighboring region, regardless of the visible intensity S=1 or 2. Visible additional information can therefore be multiplexed while maintaining an atmosphere almost identical to an original image.

Uniform color spaces CIE 1976 L*u*v* and CIE 1976 L*a*b* (to be referred to as an L*a*b* color space hereinafter) in which a color change in the space coincides with a change in color appearance have been recommended by CIE since 1976.

The uniform color space is also effective for determining the arithmetic bit region (maximum change amount $\Delta$max).

The first embodiment can set the pixel value change amount such that the noise amount added by arithmetic processing changes in accordance with the image grayscale in a region represented by watermark image shape information of an original image while maintaining the feature of an original image. In addition, no original image is required for removing added noise. Introduction of high-security cryptography to arithmetic processing makes it difficult to remove added noise.

The arithmetic bit region determination table T_N is used to determine an arithmetic bit region. An arithmetic bit region determination function F expressed by a formula can also be used, and this method also falls within the scope of the present invention.

Concrete examples of this method are as follows.

A server which services images on the Internet is installed. Images containing additional information having undergone processing in FIG. 1, and pieces of specific information (image shape information M, random number key R, arithmetic bit region determination table T, and visible intensity S) for reconstructing the respective images are stored and managed. The user (client) selects and downloads a desired image. The downloaded image contains visible additional information (e.g., a photographer name and photographing date and time), as described above, and can satisfactorily present the atmosphere of the entire image. The user notifies the server that he/she wants to reconstruct the downloaded image into an original image (e.g., by clicking a corresponding button on a browser or the like). The server transmits not the original image itself but pieces of information (image shape information M, random number key R, arithmetic bit region determination table T, and visible intensity value S) which are specific to the image and necessary for reconstruction (this can prevent leakage of the original image). In transmission, these pieces of information are encrypted by a private key, which enhances security. The user PC receives these pieces of information, and performs processing of executing processing shown in FIG. 7.

As for the random number key R, a common function for generating a random number is held in the server and client, instead of transmitting a random number itself. Only an initial parameter for generating a random number is transmitted. If the same parameter is used for all images, all images held by the server can be undesirably reconstructed. To prevent this, the parameter is changed for each image.

The first embodiment adopts two tables for determining an arithmetic bit region, as shown in FIGS. 4A and 4B. Three or more tables may also be adopted. B7 (MSB) and B6 are excluded from the arithmetic bit region. If the visible intensity is further increased or wanted to be increased, these bits can also be contained in the arithmetic region.

The visible intensity S may be set freely by the user or automatically. For example, the visible intensity S may be automatically determined using the range width and central luminance of the luminance distribution (histogram or the like may be created) of an original image as parameters. For example, when the entire original image is dark, the arithmetic bit region in which visible noise is embedded is assigned to a relatively low bit region, and additional information by visible noise may be hardly seen. For the entirely dark image, the arithmetic bit region is set up to a high bit so as to change the image to a high luminance. Accordingly, the visible intensity can be automatically increased.

As described above, according to the first embodiment, the pixel value change amount can be set as a modification to the original image that corresponds to watermark image shape information so as to desirably present a visible watermark image to the image appreciator while maintaining the feature of the original image. In addition, no original image is required for removing a visible digital watermark. Introduction of high-security cryptography to arithmetic processing makes it difficult to remove the visible digital watermark.

Second Embodiment

The first embodiment implements a visible digital watermark which saves the feature of an image within an image region corresponding to watermark image shape information and realizes a random luminance change by bit arithmetic processing without impairing image contents.

In the first embodiment, the luminance of each pixel within an image region corresponding to watermark image shape information changes at random within the maximum change amount $\Delta$max. The first embodiment has an advantage that removal of a visible digital watermark is difficult. On the other hand, there is a demand for implementing a high-quality visible digital watermark which follows the luminance change of the background within an image region corresponding to watermark image shape information, and presents the background through the image shape information.

A method according to the second embodiment can smooth variations corresponding to an original luminance value and the luminance change within an image region corresponding to watermark image shape information. If necessary, noise which makes removal of a visible digital watermark difficult is added. That is, the second embodiment provides visible digital watermark embedding processing and removal processing methods which realize a smooth luminance change within the visible digital watermark region and do not require any original image for reconstruction.

In the second embodiment, similar to the first embodiment, the neighboring region selection method and neighboring region analysis method are determined on the basis of a relatively fixed region for a pixel of interest. The neighboring region selection method and neighboring region analysis method may be changed in accordance with the pixel position or key. When these methods are changed in accordance with a key, only the user who holds the correct key can completely remove a visible watermark. This can make intentional removal of a visible digital watermark difficult.

In the second embodiment, a neighboring region which is referred to when multiplexing noise on a pixel of interest is a left adjacent pixel. As for the start pixel of each line, no neighboring region exists. Similar to the first embodiment, the second embodiment utilizes a method not referring to any neighboring region. The order of selecting unprocessed pixels is the same as that in the first embodiment.

Figure 8:
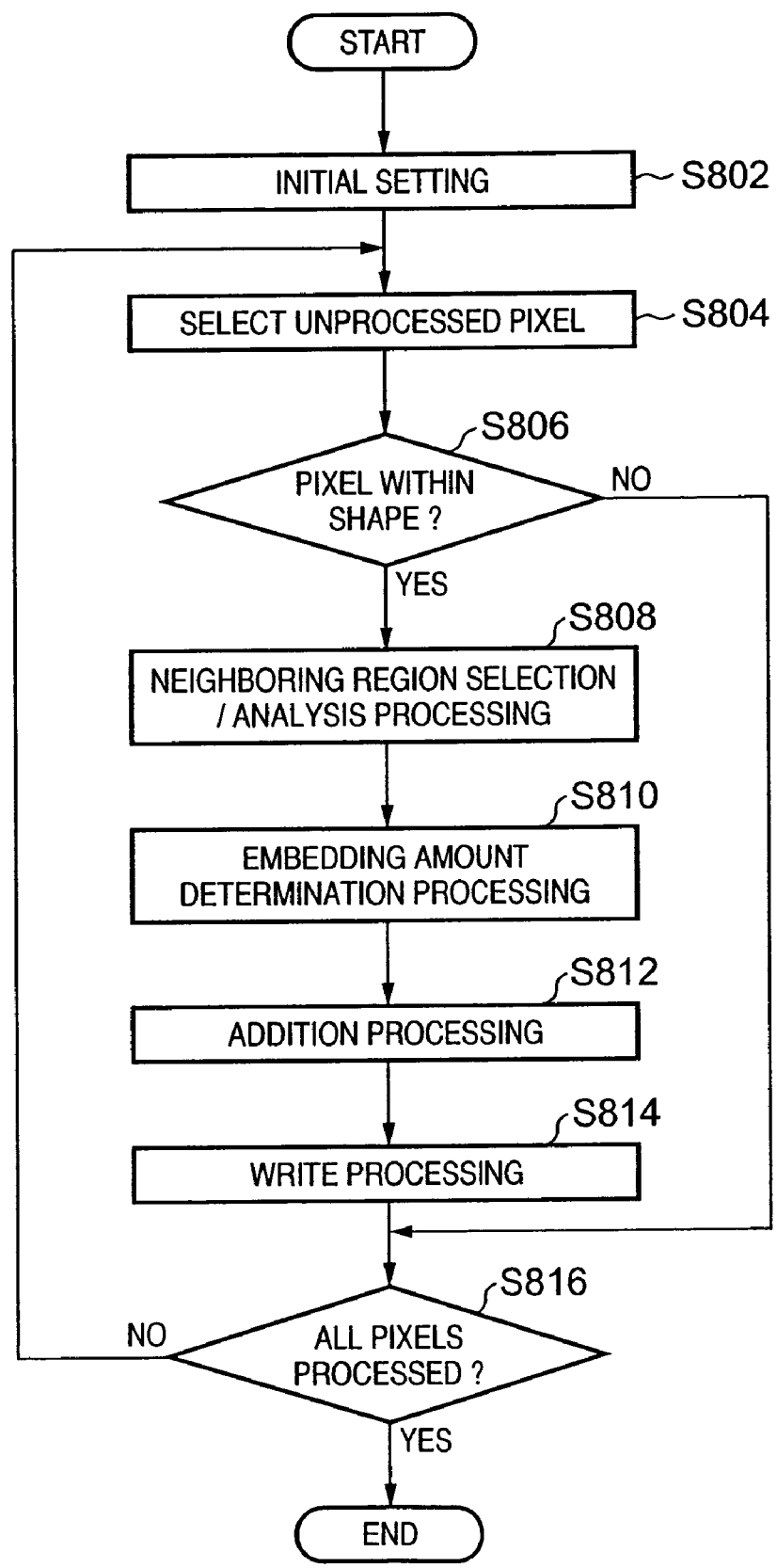
FIG. 8 is a flow chart showing visible digital watermark embedding processing according to the second embodiment.

FIG. 8 is a flow chart showing internal processing of a visible watermark embedding apparatus according to the second embodiment. Visible digital watermark embedding processing will be explained with reference to FIG. 8.

In the initial state in step S802, an original image I comprised of a plurality of pixels each having a pixel position and pixel value, watermark image shape information M comprised of a pixel position representing the shape of an embedded image, an embedding amount determination function F_E, a noise generation key RN_K and noise amplitude RN_A for generating noise, a visible intensity value S which defines the intensity of a visible digital watermark, a neighboring region selection method NS, and a neighboring region analysis method NA are set. An output image W is set equal to the input original image I.

In step S804, an unprocessed pixel of the input image is selected. The order of selecting unprocessed pixels is the same as that in the first embodiment.

In step S806, the position of the selected pixel of interest which constitutes the original image is compared with dot information of watermark image shape information, and whether the pixel of interest falls within the embedding target region is determined. If YES in step S806, the pixel position information is sent to step S808; if NO, processing for the pixel ends.

In step S808, the visible digital watermark embedding apparatus determines a region near the embedding target pixel on the basis of the initially set neighboring region selection method NS. The visible digital watermark embedding apparatus analyzes the pixel value in the neighboring region in accordance with the initially set neighboring region analysis method NA, generating a neighboring region analysis value comprised of a neighboring region pixel value and neighboring region characteristic value.

In step S810, an embedding amount ΔY to be added to the embedding target pixel is determined using the embedding amount determination function F_E on the basis of the neighboring region analysis value generated in step S808, the visible intensity value S, and the noise generation key RN_K and noise amplitude RN_A input by initial setting. The method of determining ΔY will be described in detail.

In step S812, the embedding amount ΔY determined in step S810 is added to the pixel value of the input pixel. At this time, in place of simple addition processing, the maximum expressible grayscale value (256 for 8 bits) is added/subtracted after addition to make the added pixel value fall within the expressible grayscale range in consideration of the case wherein the added pixel value exceeds the expressible grayscale (for example, the pixel value is less than 0 or 256 or more for an 8-bit grayscale image).

In step S814, write processing of writing the added pixel value in the output image W is executed. In step S816, whether all pixels have been processed is determined. If NO in step S816, processing returns to step S804 to continue the above-described processing until all pixels have been processed.

The outline of visible digital watermark embedding processing according to the second embodiment has been described.

Figure 9:
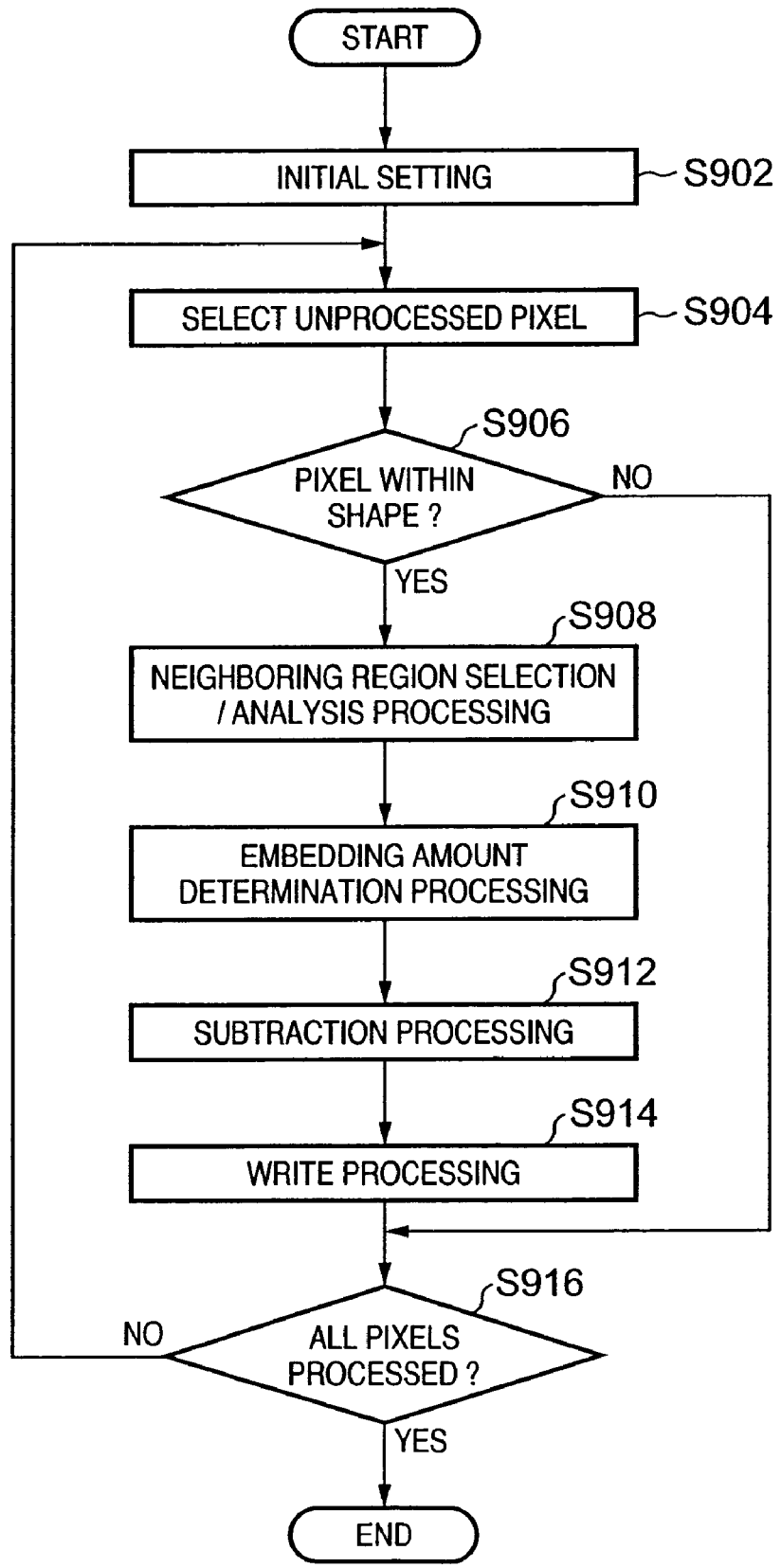
FIG. 9 is a flow chart showing visible digital watermark removal processing according to the second embodiment.

Visible digital watermark removal processing according to the second embodiment will be briefly described with reference to FIG. 9.

In the initial state in step S902, a watermark-embedded image W in which a visible watermark comprised of a plurality of pixels each having a pixel position and pixel value is embedded, watermark image shape information M comprised of a pixel position representing the shape of an embedded image, an embedding amount determination function F_E, a noise generation key RN_K and noise amplitude RN_A for generating noise, a visible intensity value S which defines the intensity of a visible digital watermark, a neighboring region selection method NS, and a neighboring region analysis method NA are set. An output image E is set equal to the watermark-embedded image W.

In step S904, an unprocessed pixel of the input image is selected.

In step S906, the pixel position of the pixel which constitutes the input image is compared with watermark image shape information, and whether the pixel is a noise-added (multiplexed) pixel is determined. If YES in step S906, the pixel position information is sent to step S908; if NO, processing for the pixel ends.

Processing advances to step S908, and the visible digital watermark removal apparatus determines a region near the embedding target pixel on the basis of the initially set neighboring region selection method NS (similar to the first embodiment, the neighboring region is a restored region). The visible digital watermark removal apparatus analyzes the pixel value in the neighboring region in accordance with the initially set neighboring analysis method NA, generating a neighboring region analysis value comprised of a neighboring region pixel value and neighboring region characteristic value.

In step S910, an embedding amount ΔY to be added to the embedding target pixel is determined using the embedding amount determination function F_E on the basis of the neighboring region analysis value generated in step S908, the visible intensity value S, and the noise generation key RN_K and noise amplitude RN_A input by initial setting.

In step S912, the embedding amount ΔY determined in step S910 is subtracted from the pixel value of the input pixel. When the subtracted pixel value exceeds the expressible grayscale, it can be considered that the pixel value has been made to fall within the expressible grayscale range by addition processing. In place of simple subtraction processing, the maximum expressible grayscale value (256 for 8 bits) is added/subtracted after subtraction to make the subtracted pixel value fall within the expressible grayscale range.

In step S914, write processing of writing the subtracted pixel value in the output image E is executed. In step S916, whether all pixels have been processed is determined. If NO in step S916, processing returns to step S904 to continue the above-described processing until all pixels have been processed.

The outline of visible digital watermark removal processing according to the second embodiment has been described.

In the second embodiment, similar to the first embodiment, the change amount of an embedding target pixel is determined from a neighboring region, realizing a completely reversible visible digital watermark.

As described in the first embodiment, a natural image generally has a high correlation between adjacent pixels.

The embedding amount which is calculated from the pixel of a neighboring region and sensed by the human eye is proper as an embedding amount to an embedding target pixel that is sensed by the human eye. A visible digital watermark can be embedded with high image quality. The second embodiment also utilizes this fact.

A method of calculating the embedding amount ΔY from the pixel value of the pixel in the neighboring region will be described as the feature of the second embodiment.

The visual characteristic of the human eye is known to be logarithmic to the luminance such that an arithmetic luminance change does not seem to be a constant change but a geometric luminance change seems to be constant change. A value obtained by converting the luminance so as to sense a constant change in consideration of the visual characteristic of the human eye is called lightness (L*). The lightness (L*) is calculated by raising the luminance to almost (⅓)th power. The lightness is close to the numerical expression of the human sense, and is effective for determining the embedding amount ΔY of a visible digital watermark similarly perceived at any grayscale.

Uniform color spaces CIE 1976 L*u*v* and CIE 1976 L*a*b* (to be referred to as an L*a*b* color space hereinafter) in which a color change in the space coincides with a change in color appearance have been recommended by CIE since 1976. Not only the luminance but also a color image can also be processed in the uniform color space.

The uniform color space is designed such that a distance in the uniform color space coincides with the degree of a visually sensed color shift. The color difference can be quantitatively evaluated by the distance (color difference ΔEab*) in the L*a*b* color space. Because of convenience, the color difference ΔEab* is utilized in various fields where color images are processed.

Conversion of the luminance value (Y) and lightness (L*) is given by $L^* = 116(Y/Y_n)^{1/3} - 16$ for $Y/Y > 0.008856$ $L^* = 903.3(Y/Y_n)$ for $Y/Y \leq 0.008856$ ($Y_n$ is the Y value of the reference white plane and is generally 100.)

In the second embodiment, the embedding amount determination function F_E utilizes the uniform color space to determine an embedding amount ΔY which allows perceiving a constant change at any grayscale. Note that transformation into a uniform color space may be achieved by a formula or by looking up a lookup table for higher speed.

Neighboring region selection/analysis processing (step S808) and embedding amount determination processing (step S810) will be described in detail. Neighboring region selection/analysis processing is the same as that in the first embodiment, and will be described using the neighboring region selection and analysis units in FIG. 6.

For descriptive convenience, in the second embodiment, similar to the first embodiment, the neighboring region selection unit uses as a neighboring region a pixel left adjacent to an embedding target pixel, and the neighboring region analysis means uses the pixel value of the neighboring region as the neighboring region pixel value of the neighboring region analysis value.

When a pixel 13a is set as an embedding target pixel in FIG. 6, the neighboring region selection unit selects as a neighboring region a pixel 12a left adjacent to the pixel 13a. The neighboring region analysis unit analyzes the pixel 12a, and outputs the pixel value (112) of the pixel 12a as the neighboring region pixel value of the neighboring region analysis value. The neighboring region selection/analysis unit is almost the same as that in the first embodiment.

An embedding amount determination-unit according to the second embodiment will be explained.

Figure 10:
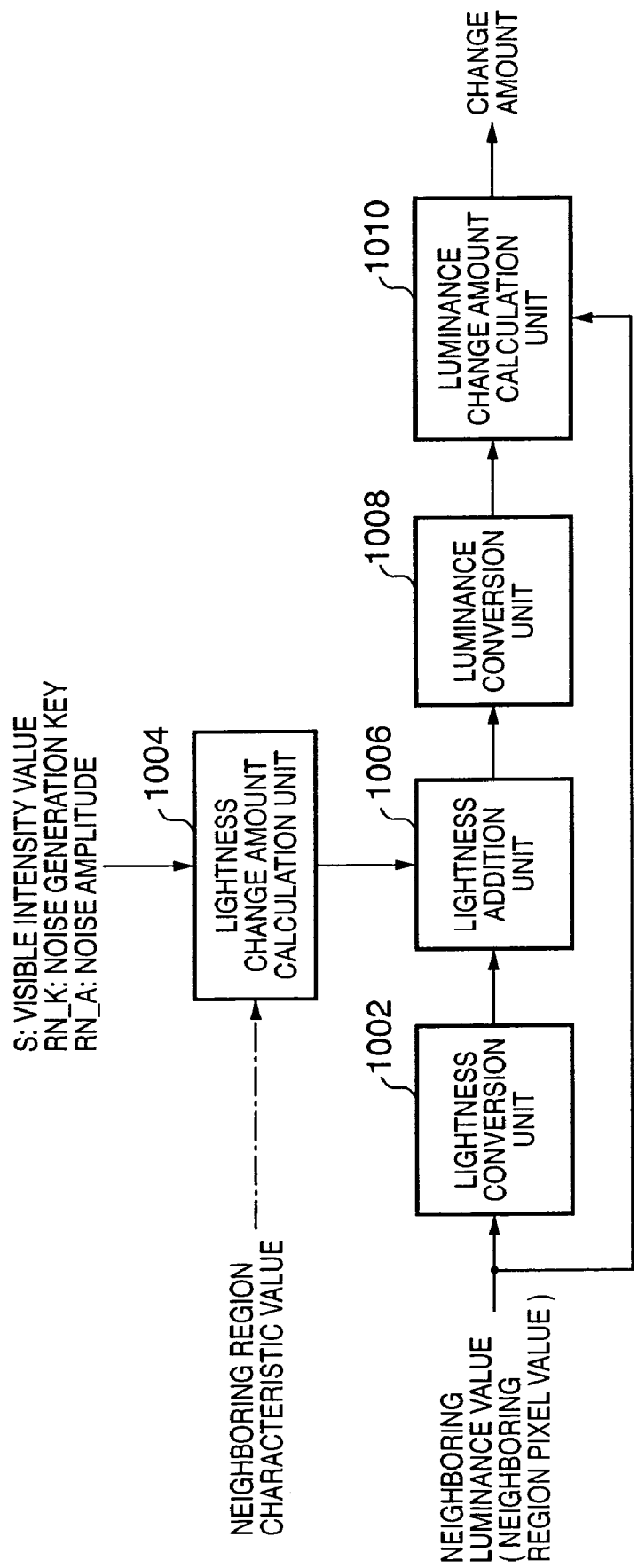
FIG. 10 is a block diagram showing the internal arrangement of an embedding amount determination unit which executes embedding amount determination processing.

FIG. 10 is a block diagram showing the internal arrangement of the embedding amount determination unit which executes embedding amount determination processing in step S810.

A neighboring luminance value is calculated from the neighboring region pixel value of the neighboring region analysis value output from the neighboring region selection/analysis unit. A neighboring luminance value Y_ngh has a luminance value almost equal to that of an embedding target pixel. The neighboring luminance value Y_ngh may be an average value within the neighboring region, or the predicted value (neighboring region pixel value) of the pixel value of the embedding target pixel that is calculated within the neighboring region.

The neighboring luminance value Y_ngh is input to a lightness conversion unit 1002.

The lightness conversion means 1002 converts the input neighboring luminance value Y_ngh into a lightness, and inputs a neighboring lightness value L_ngh to a lightness addition unit 1006 on the output stage.

An initially set visible intensity value S, noise generation key RN_K, and noise amplitude RN_A are input to a lightness change amount calculation unit 1004. The lightness change amount calculation unit 1004 calculates a lightness change amount ΔL from the input values, and inputs it to the lightness addition unit 1006 on the output stage.

At this time, neighboring region characteristic values such as the frequency characteristic of the neighboring region and the color difference may also be input to the lightness change amount calculation unit 1004 to calculate the lightness change amount ΔL.

The lightness addition unit 1006 adds the input neighboring lightness value L_ngh and lightness change amount ΔL to generate a modified neighboring lightness value L_ngh_mdf and output it to a luminance conversion unit 1008 on the output stage.

The luminance conversion unit 1008 converts the modified neighboring lightness value L_ngh_mdf into a luminance again to generate a modified neighboring luminance value Y_ngh_mdf and input it to a luminance change amount calculation unit 1010 on the output stage.

To implement a reversible digital watermark, the modified neighboring luminance value Y_ngh_mdf is quantized within the maximum expressible grayscale range (for example, quantized to 255 for a value of 255 or more, or rounded for a floating point).

The luminance change amount calculation unit 1010 calculates the difference between the neighboring luminance value Y_ngh and the modified neighboring luminance value Y_ngh_mdf, and defines the difference as the embedding change amount ΔY. The embedding change amount ΔY is a change amount directly added to the luminance value (pixel value) of an embedding target pixel.

Processing of the embedding amount determination unit will be described in detail with reference to FIG. 6. Also in this case, the pixel 13a is an embedding target pixel, and the pixel 12a is a neighboring region.

The luminance value (112) of the pixel 12a serving as a neighboring region is input to the lightness conversion unit 1002, and converted into a lightness value (104.47). Since an input image is assumed to be an 8-bit grayscale image, the luminance value is equal to the pixel value. For an RGB color image, the luminance (Y) is temporarily calculated and then converted into the lightness (L*).

An initially set visible intensity value S, noise generation key RN_K, and noise amplitude RN_A are input to the lightness change amount calculation unit 1004 to determine the lightness change amount ΔL. The lightness change amount ΔL is comprised of a lightness shift value ΔL_S and noise component RN, and given by ΔL=ΔL_S+RN.

The lightness shift value ΔL_S is calculated by substituting the initially set visible intensity value S into a function L_SHIFT. That is, $$\Delta L\_S = L\_SHIFT(S)$$

For S=ΔL_S in the function L_SHIFT, the lightness shift value ΔL_S is 3 for S=3. The function L_SHIFT basically has a linear relationship with S. As will be described in detail later, the neighboring luminance value Y_ngh may be compared with a proper threshold to determine the sign of ΔL_S.

The noise generation key RN_K is used to generate a noise component RN_N ranging from −1 to 1. The noise component RN_N is multiplied by the noise amplitude RN_A to increase the amplitude, obtaining an amplitude-increased noise component RN. Assuming that a function RAND generates a value of −1 to 1, the noise component RN is given by $$RN = RAND(RN\_K) \times RN\_A$$

Assuming that the noise amplitude RN_A is set to 0, RN is 0.

If the noise component RN is added to ΔL_S, the noise component cannot be removed unless key information for generating noise is obtained. This can make removal of a visible digital watermark more difficult.

The visibility of a visible digital watermark is related to the embedding amount ΔY (i.e., the visible intensity value S and noise amplitude RN_A).

The visible intensity value S and noise amplitude RN_A are changed on the basis of the neighboring region characteristic value (having characteristic information such as the frequency characteristic) input to the lightness change amount calculation unit 1004 in FIG. 10. This processing can facilitate recognition of a visible digital watermark even in a texture region or the like.

The lightness change amount calculation unit 1004 finally executes ΔL=ΔL_S+RN to obtain the lightness change amount ΔL=3.

The lightness addition unit 1006 adds the neighboring lightness value L_ngh (104.47) and the lightness change amount ΔL (3) to obtain the modified neighboring lightness value L_ngh_mdf (107.47).

As will be described later, the sign of ΔL_S need not be constant in the entire image, but may be determined by a comparison with a predetermined threshold.

The luminance conversion unit 1008 converts the modified neighboring lightness value L_ngh_mdf (107.47) into a luminance to obtain the modified neighboring luminance value Y_ngh_mdf (120.59).

If the modified neighboring luminance value Y_ngh_mdf exceeds the expressible grayscale (e.g., exceeds the range of 0 to 255 for an 8-bit grayscale), the modified luminance value is set to 0 for a value of 0 or less and 255 for a value of 255 or more.

The luminance change amount calculation unit 1010 calculates the difference between the modified neighboring luminance value Y_ngh_mdf and the neighboring luminance value Y_ngh, obtaining the embedding change amount ΔY.

Since an 8-bit grayscale image is assumed, the modified neighboring luminance value Y_ngh_mdf must be quantized to a range expressible by 8 bits. Hence, 120.59 is rounded to the nearest integer of 121. Instead of rounding to the nearest integer, the value may be changed into an integer by rounding-up or rounding-down.

Finally, the embedding change amount ΔY is calculated by the modified neighboring luminance value "121"—the neighboring luminance value "112"=9.

In embedding amount determination processing in step S810 of FIG. 8, the embedding change amount ΔY is calculated by the above procedures.

In step S812 of FIG. 8 as visible digital watermark embedding processing, the embedding change amount ΔY is added to the luminance value of an embedding target pixel.

An example of independently embedding the embedding change amount ΔY in the color components (R, G, and B) of an RGB color image will be described.

A neighboring luminance value Y_ngh and neighboring color difference values U_ngh and V_ngh are obtained on the basis of a neighboring region pixel value attained by selecting and analyzing a region near an embedding target pixel. (It is also possible to first obtain a neighboring R value R_ngh, neighboring G value G_ngh, and neighboring B value B_ngh, and then obtain the neighboring luminance value Y_ngh and the neighboring color difference values U_ngh and V_ngh.)

A modified neighboring luminance value Y_ngh_mdf is obtained on the basis of the visible intensity value S and random number.

As described above, the embedding amount ΔY as the difference between Y_ngh_mdf and Y_ngh is calculated using the visible intensity value S, random number, uniform color space, and the like. The modified neighboring luminance value Y_ngh_mdf must be calculated in consideration of the following fact.

A color space expressible by 8-bit R, G, and B values falls within part (inscribed figure) of a color space expressible by Y, U, and V intermediate values. If colors expressible by 8-bit Y, U, and V values are returned to R, G, and B values, all colors are not always expressed by R, G, and B values. (When 8-bit R, G, and B values are transformed into Y, U, and V values, each value falls within 8 bits. When, however, 8-bit Y, U, and V values are transformed into R, G, and B values, a negative value or a value larger than 8 bits may be taken. That is, some colors cannot be expressed by 8-bit R, G, and B values.) This can be understood from transformations from RGB to YUV and from YUV to RGB.

Hence, the modified neighboring luminance value Y_ngh_mdf must fall within a color range expressible by 8-bit R, G, and B color spaces when the modified neighboring luminance value Y_ngh_mdf and corresponding color differences are returned to R, G, and B.

Whether a value calculated from the modified neighboring luminance value Y_ngh_mdf and corresponding color differences must fall within the range ΔY expressible by 8-bit R, G, and B values can be simply checked as follows. The luminance Y is obtained by Y=0.299*R+0.5870*G+0.1140*B from R, G, and B values within the range of 0 to 255. To change the luminance without changing the color difference, the R, G, and B values must be increased/decreased by a predetermined amount. Of the values R_ngh, G_ngh, and B_ngh, a value closest to 0 or 255 is used to calculate the possible range (shiftable range) of ΔY where the color difference is not changed.

When the difference ΔY between the modified neighboring luminance value Y_ngh_mdf and the neighboring luminance value Y_ngh that is calculated from the visible intensity value S and random number using the uniform color space does not fall within the shiftable range, the modified neighboring luminance value Y_ngh_mdf is set to a value obtained by adding, to the neighboring luminance value Y_ngh, ΔY' closest to ΔY calculated within the shiftable range. If ΔY falls within the shiftable range, the modified neighboring luminance value Y_ngh_mdf is directly adopted.

A modified neighboring R value R_ngh_mdf, modified neighboring G value G_ngh_mdf, and modified neighboring B value B_ngh_mdf are calculated from the modified neighboring luminance value Y_ngh_mdf and corresponding color differences.

Differences are calculated between the modified neighboring R value (R_ngh_mdf) and the neighboring R value (R_ngh), between the modified neighboring G value (G_ngh_mdf) and the neighboring G value (G_ngh), and between the modified neighboring B value (B_ngh_mdf) and the neighboring B value (B_ngh), and defined as embedding change amounts ΔR, ΔG, and ΔB.

The embedding change amounts ΔR, ΔG, and ΔB are also quantized (rounded), similar to the 8-bit grayscale. Embedding and removal of a visible digital watermark is performed for the respective R, G, and B components. If the pixel values of the respective colors after adding the embedding change amounts ΔR, ΔG, and ΔB exceed the maximum expressible grayscale range, the maximum expressible grayscale value is added/subtracted to make the pixel values fall within the expressible grayscale range, similar to luminance embedding.

This processing realizes reversible embedding/removal which prevents information loss caused by the transformation between RGB and the luminance color difference.

In referring to the neighbor in removal, a restored neighboring pixel value must be referred to.

Also in a color image, the luminance need not be kept constant for each color component, and the threshold may be independently set to embed a visible digital watermark. In this case, the hue changes, but the visible digital watermark is easy to see.

Figure 11A:
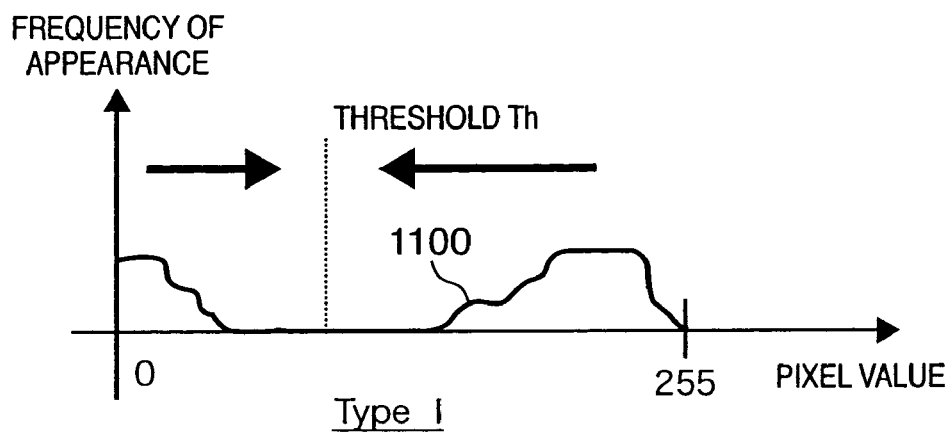
FIGS. 11A, 11B and 11C are graphs for explaining threshold setting for determining the sign of the embedding amount.
Figure 11B:
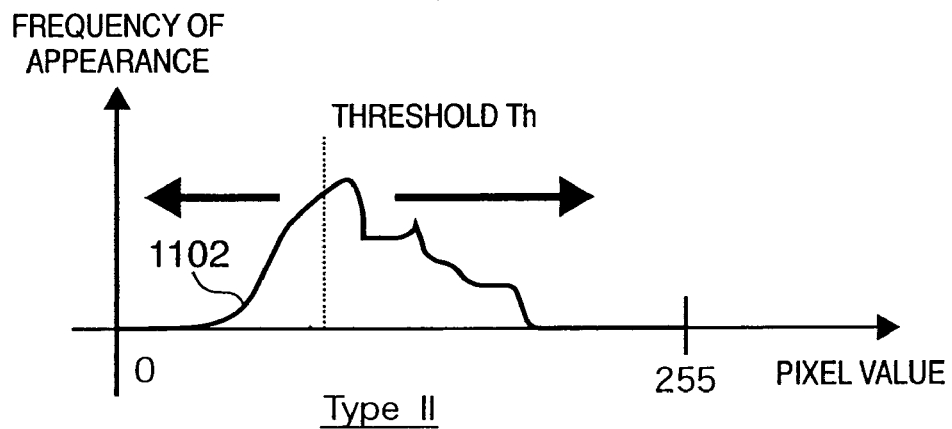
Figure 11C:
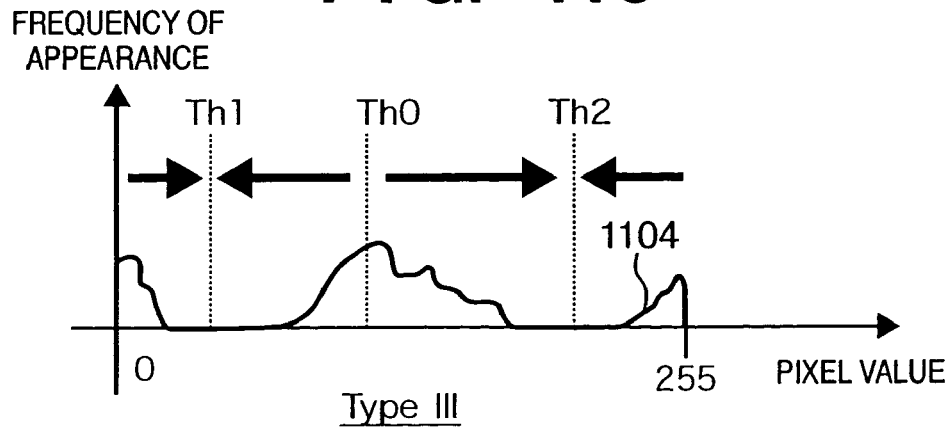

The threshold for determining the sign of ΔL_S will be described. In FIGS. 11A to 11C, reference numerals 1100, 1102, and 1104 denote histograms for the pixel values (luminance values) of pixels at positions corresponding to predetermined watermark image shape information in a predetermined image.

When luminance values of almost 0 or 255 frequently appear, like the histogram 1100, a threshold setting (type 1) "ΔL_S is negative for a threshold Th or more and positive for less than the threshold Th" is suitable. This setting prevents a pixel value after embedding a visible digital watermark from exceeding the expressible grayscale.

When luminance values of almost 0 or 255 hardly appear, like the histogram 1102, a threshold setting (type 2) "ΔL_S is positive for the threshold Th or more and negative for less than the threshold Th" may be adopted.

It is also possible to set the threshold to 0 or 255 in accordance with the histogram, fix the sign to either a positive or negative value, and prevent a pixel value after embedding from exceeding the expressible grayscale.

For a complicated histogram, like the histogram 1104, the following threshold setting (type 3) is preferable.

For 0<=Y_ngh<Th1, ΔL_S>=0

For Th1<=Y_ngh<Th0, ΔL_S<=0

For Th0<=Y_ngh<Th2, ΔL_S>=0

For Th2<=Y_ngh<=255, ΔL_S<=0

Also in this case, the pixel value after embedding can be prevented from exceeding the expressible grayscale. In this fashion, the threshold need not always be limited to one.

If threshold setting of type 1 is done for an image having a histogram like the histogram 1102, pixel values around the threshold are shifted in opposite directions. A smooth grayscale image having many pixel values around the threshold cannot maintain smooth grayscale after embedding a visible digital watermark, degrading the image quality.

To avoid this, the pixel values of pixels corresponding to predetermined watermark image shape information may be analyzed to dynamically calculate an optimal threshold setting for each image or each watermark image shape information. An optimal threshold may be set for a set of successive pixels (e.g., for one character when embedding a plurality of characters) in watermark image shape information.

An optimal threshold is set in initial setting processing (step S802).

To create a histogram, variables D(0) to D(255) which are initialized to 0 in advance are ensured, and an embedding target original image is sequentially scanned. If the pixel value (luminance value) is "i", D(i)←D(i)+1 is calculated to obtain the frequency of each luminance.

The threshold is key information necessary for removing a visible digital watermark, and is information indispensable for removing a visible digital watermark (several thresholds are prepared, and each threshold is contained as one element of key information).

Addition processing in step S812 will be explained. In addition processing of step S812, the luminance value Y and embedding change amount ΔY of an embedding target pixel are added for each embedding target pixel. If the sum exceeds the expressible grayscale (e.g., exceeds the range of 0 to 255 for an 8-bit grayscale image), the maximum expressible grayscale value is added/subtracted to make the sum fall within the expressible grayscale range.

For example, when an embedding target pixel in an 8-bit grayscale image has the luminance value Y=240 and the embedding change amount ΔY=20, the sum is 260. The 8-bit grayscale image cannot express this value, and the maximum expressible grayscale value "256" is subtracted again to change the sum to 4.

In subtraction processing of the visible digital watermark removal apparatus, the luminance value Y=4 and the embedding change amount ΔY=20 are obtained for a removal target pixel, and the difference is −16. This value cannot be expressed by an 8-bit grayscale image, and the maximum expressible grayscale value "256" is added to change the restored pixel value to 240. The luminance value can therefore be returned to one before embedding.

More specifically, in embedding, the maximum expressible grayscale value is subtracted for a positive sum and added for a negative sum when the sum falls outside the maximum expressible grayscale range as long as the absolute value of ΔY falls within the maximum expressible grayscale range. In removal, the maximum expressible grayscale value is subtracted for a positive difference and added for a negative difference when the difference falls outside the maximum expressible grayscale range.

A luminance value obtained from a neighboring region and the luminance value of an embedding target pixel do not always coincide with each other, and the sum may exceed the expressible grayscale of the image. In this case, the maximum expressible grayscale value is added/subtracted in the above-described way to make the luminance value fall within the expressible grayscale, realizing a reversible digital watermark.

The relationship between pixel values before and after embedding is defined using a function or lookup table without referring to a neighboring region. In this case, if the pixel value exceeds the maximum expressible grayscale value upon embedding, pixel values of less than 0 and 256 or more are respectively defined as 0 and 255. One-to-one correspondence between pixel values before and after embedding is lost, and a reversible digital watermark cannot be implemented without any difference information. Also when the maximum expressible grayscale value is added/subtracted to/from a pixel value exceeding the maximum expressible grayscale range to make the pixel value fall within the maximum expressible grayscale range, and in addition no neighboring region is referred to, one-to-one correspondence between pixel values before and after embedding is lost, and a reversible digital watermark cannot be implemented without any difference. It is therefore difficult to implement a reversible digital watermark without any difference image in a high-quality visible digital watermark whose embedding amount is determined in accordance with the pixel value.

The method of the second embodiment can implement an easy-to-see visible digital watermark and a completely reversible digital watermark while maintaining the feature of an image.

The second embodiment has described implementation of a reversible digital watermark. If the digital watermark need not be reversible, a neighboring region including an embedding target pixel is analyzed in neighboring region selection/analysis processing in step S808 of FIG. 8, and the neighboring region analysis value is output to step S810. In embedding amount determination processing of step s810, the embedding amount $\Delta Y$ is determined on the basis of not the neighboring region pixel value (neighboring luminance value) but the luminance value of the embedding target pixel. At this time, a neighboring region characteristic value generated in neighboring region selection/analysis processing of step S808 may be used. For example, when the embedding target pixel is determined to be a high-frequency component or texture from the neighboring region characteristic value of the neighboring region analysis value of the embedding target pixel, the embedding amount obtained from the embedding target pixel is increased for good visibility.

By holding a difference image, a reversible digital watermark can be implemented by replacing a pixel value with the closest expressible grayscale value (0 or 255) when the pixel value exceeds the maximum expressible grayscale range (0 to 255 for an 8-bit grayscale image) as a result of adding the embedding amount $\Delta Y$.

In this case, if a pixel value exceeding the maximum expressible grayscale range and a difference pixel value corresponding to the expressible grayscale value (0 or 255) closest to the exceeding pixel value are held, a reversible digital watermark can be implemented using the difference pixel value. According to the method of the second embodiment, the pixel value relatively readily exceeds the maximum expressible grayscale range as a result of adding the embedding amount $\Delta Y$ when the pixel value of a neighboring region and the pixel value of an embedding target pixel have a difference and a calculated embedding change amount $\Delta Y$ is not proper as an embedding amount $\Delta Y$ for the embedding target pixel. However, restore difference information can be greatly reduced, compared to a conventional method of holding a difference and original image for each pixel and realizing a reversible digital watermark.

The second embodiment has mainly described a method of adding/subtracting the maximum expressible grayscale value to/from a pixel value exceeding the maximum expressible grayscale after adding the embedding amount $\Delta Y$, and making the pixel value fall within the expressible grayscale range.

According to the above-described method, the pixel value hardly changes unless the pixel value exceeds the expressible grayscale range after adding the embedding amount $\Delta Y$. If the pixel value exceeds this range, the pixel value greatly changes before and after embedding. In this case, the pixel value becomes unnatural in comparison with surrounding pixel values, and may be perceived as large noise.

To prevent this, the following processing may be employed.

On the embedding side, in addition processing of step S1312 (FIG. 8) by the visible watermark embedding apparatus, the following processing is performed.

(1) When the pixel value after adding the embedding amount $\Delta Y$ exceeds the expressible grayscale range, a portion "1" within the shape is changed to "0" at an embedding position corresponding to watermark image shape information M input by initial setting without executing addition processing.

(2) When the pixel value after adding the embedding amount $\Delta Y$ does not exceed the expressible grayscale range, addition processing is executed without changing an embedding position corresponding to watermark image shape information.

After the above processing is performed for all the pixels of an input image, the visible digital watermark embedding apparatus outputs, as key information, modified watermark image shape information M' representing a position where addition processing has actually been done.

The modified watermark image shape information M' reflects position information where no watermark is embedded in the input watermark image shape information M by the visible watermark embedding apparatus.

The remaining processing of the visible digital watermark embedding apparatus (FIG. 8) is executed by the same procedures as those described above.

In initial setting of step S902 by the visible watermark removal apparatus (FIG. 9), the removal side loads the modified watermark image shape information M' which is output as key information from the visible watermark embedding apparatus, instead of the watermark image shape information M.

If "1" meaning that the pixel falls within the shape is set at an embedding position corresponding to the modified watermark image shape information M', an embedding amount $\Delta Y$ calculated from a neighboring region is subtracted by the same procedures as those described above in the second embodiment, returning the pixel value to an original one. If "0" meaning that the pixel falls outside the shape is set, embedding processing is determined to have not been performed, and processing shifts to the next pixel.

This processing is done for all pixels, obtaining an image from which the visible digital watermark is completely removed.

The visible digital watermark removal apparatus (FIG. 9) performs the remaining processing by the same procedures as those described above except that the modified watermark image shape information M' is input in initial setting of step S902 in place of the watermark image shape information M.

The above-described method can prevent a pixel value change larger than the embedding change amount ΔY upon adding/subtracting the maximum expressible grayscale value in order to make the pixel value fall within the expressible grayscale without increasing key information necessary for extraction.

Generally in a natural image, adjacent pixel values have a high correlation, and all the values of modified watermark image shape information M' output from the visible digital watermark embedding apparatus rarely become "0".

In initial setting of step S802, key information may be generated by optimizing other key information parameters such as the visible intensity value S, noise amplitude RN_A, neighboring region selection method NS, and neighboring region analysis method NA such that the human eye can sense modified watermark image shape information M' almost similarly to watermark image shape information M.

As described above, the second embodiment utilizes a characteristic in which a noise addition pixel position has a value close to the luminance of a neighboring pixel. The pixel value (luminance value) of the neighboring region is converted into a lightness value having an almost linear relationship with the human visual characteristic. A lightness amount to be added is determined on the basis of the luminance value of the neighboring region, the visible intensity value S, the noise generation key RN_K, and the noise amplitude RN_A. If the luminance of an original image in shape information is almost uniform, a uniform lightness change amount is added. If the original image in the shape information has a portion where the luminance abruptly changes, corresponding lightness change amounts are added to low- and high-luminance portions. Hence, reversible additional information can be so added as to naturally provide the background original within the shape information.

Third Embodiment

In the first embodiment, an arithmetic bit region is determined using the arithmetic bit region determination table T_N. In the third embodiment, an arithmetic bit region is determined using an arithmetic bit region determination function F.

In the third embodiment, similar to the first and second embodiments, a region near an embedding target pixel is selected/analyzed, the neighboring region analysis value is generated, and the neighboring luminance value Y_ngh is obtained in neighboring region selection/analysis processing of step S108 in visible digital watermark embedding processing.

In arithmetic bit region determination processing of step S110, similar to the second embodiment, the modified neighboring luminance value Y_ngh_mdf is obtained on the basis of the neighboring luminance value Y_ngh by using a predetermined threshold, the watermark intensity value S, the uniform color space, and the like.

For example, the watermark intensity value S is set in correspondence with the change amount ΔL_S in the uniform color space, and the sign of ΔL_S is determined by comparing ΔL_S with a proper threshold (e.g., a threshold "128" or a plurality of thresholds "64", "128", and "192"). Processing up to this step is almost the same as that in the second embodiment. Similar to the second embodiment, it is also possible to adopt the step of adding the noise component RN based on a random number, calculate the modified neighboring luminance value Y_ngh_mdf, and make removal of a visible digital watermark difficult.

The embedding amount ΔY as the difference between Y_ngh_mdf and Y_ngh is determined. The embedding amount ΔY is made to correspond to the maximum change amount Δmax in the first embodiment, and is expressed by bits (e.g., 8 bits), similar to the pixel value of an input image.

The embedding amount ΔY is expressed by 8 bits. A bit position corresponding to "1" is defined as an arithmetic bit region, and a bit position corresponding to "0" is defined as a non-arithmetic bit region. By designating the arithmetic bit region, a random pixel value change in arithmetic processing can be adjusted relatively close to the modified neighboring luminance value Y_ngh_mdf. Information on the arithmetic bit region and non-arithmetic bit region is output to arithmetic processing of step S112, and predetermined arithmetic processing is executed to embed a visible digital watermark.

A simple example of the arithmetic bit region determination function F has been described, and there is room for optimizing the arithmetic bit region determination method.

In the third embodiment, the processing speed is low because calculation using the function is executed to determine an arithmetic bit region. However, the third embodiment can eliminate an arithmetic bit region lookup table with a relatively large information amount which must be commonly held between the visible digital watermark embedding and removal apparatuses. The third embodiment can embed a visible digital watermark corresponding to the feature of an image on the basis of neighboring region information and the visible intensity value S.

Fourth Embodiment

In the first to third embodiments, watermark image shape information has, at each pixel, one bit representing whether the pixel is a region where a visible digital watermark is to be embedded.

Alternatively, watermark image shape information may have, at each position, information of a plurality of bits representing the watermark intensity in the watermark image shape.

For example, 0 represents a non-watermark embedding region, and the remaining values (1, 2, 3, . . . ) represent embedding intensities in the watermark image shape of a visible digital watermark (in the first embodiment, "1" at the pixel position of image shape information represents a noise addition region, and "0" represents a non-addition region).

FIG. 12 shows an example of watermark image shape information having information of a plurality of bits (multilevel) per pixel. The embedding intensity is set high at the periphery, and the intensity of a visible digital watermark increases for an inner pixel. By giving a watermark intensity value to each position of a watermark image shape, a stereoscopic visible watermark whose lightness change perceivable by the user is not uniform can be implemented within the watermark image shape.

Figure 13:
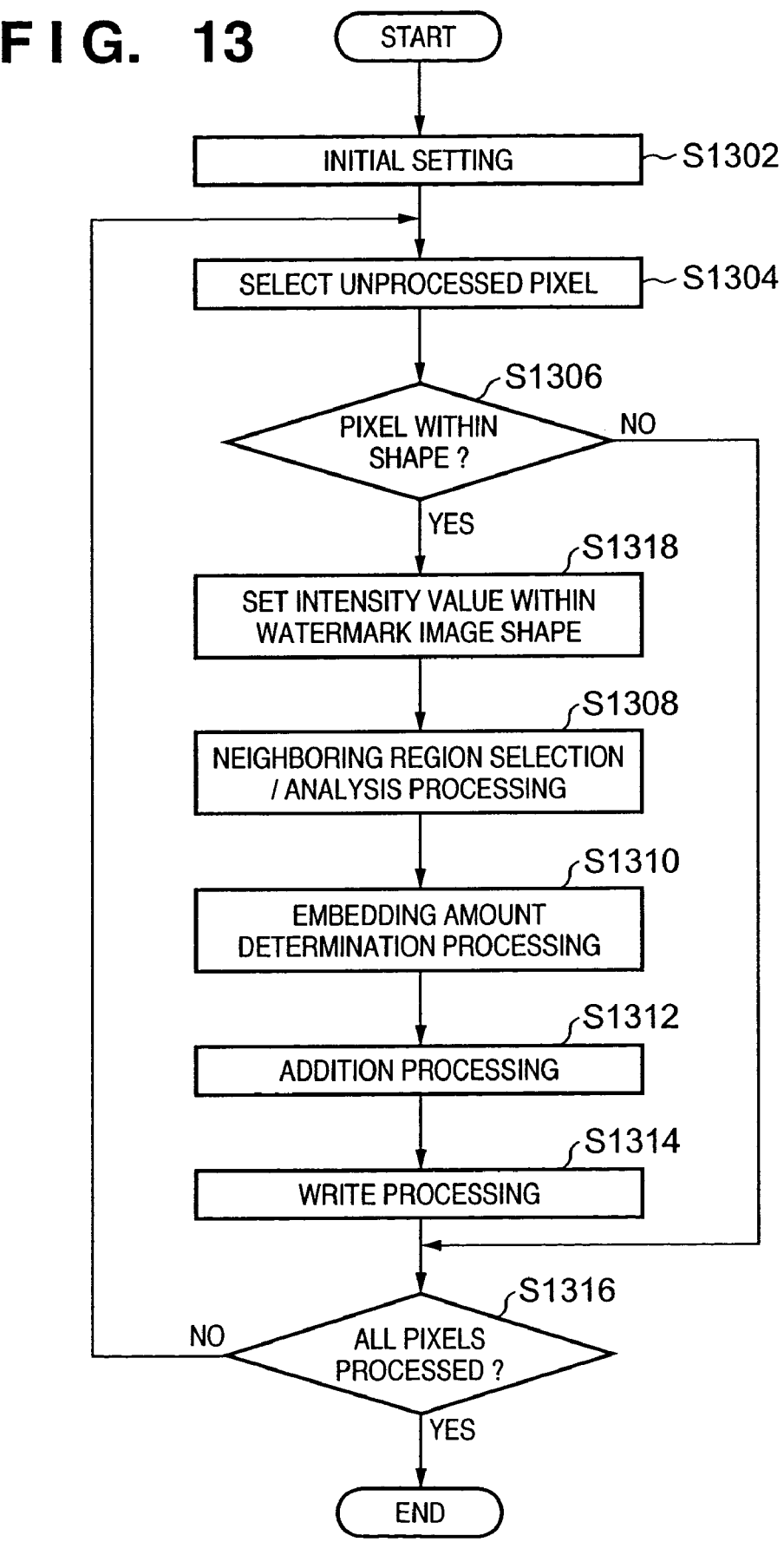
FIG. 13 is a flow chart showing an example of visible digital watermark embedding processing according to the third embodiment.

FIG. 13 is a flow chart of a visible digital watermark embedding apparatus when watermark image shape information having a watermark image shape intensity value representing a watermark intensity in a watermark image shape at each pixel is applied to the second embodiment. The visible digital watermark embedding apparatus will be described.

In the initial state in step S1302, an original image I comprised of a plurality of pixels each having a pixel position and pixel value, watermark image shape information M comprised of a pixel position representing the shape of an embedded image and a watermark image shape intensity value representing a watermark intensity in a watermark image shape, an embedding amount determination function F_E, a noise generation key RN_K and noise amplitude RN_A for generating noise, a visible intensity value S which defines the intensity of a visible digital watermark, a neighboring pixel selection method NS, and a neighboring pixel analysis method NA are set. An output image W is set equal to the input original image I.

In step S1304, an unprocessed pixel of the input image is selected.

In step S1306, the pixel position of a pixel which constitutes the original image is compared with watermark image shape information. If information at a corresponding position in the watermark image shape information is "0", the pixel is determined not to fall within the watermark image shape, and processing for the pixel ends. If information at the corresponding position in the watermark image shape information is not "0", the pixel is determined to fall within the watermark image shape, and processing advances to step S1318.

In step S1318, the value at the corresponding position in the watermark image shape information is read and set as a watermark image shape intensity value IN_A, and processing advances to step S1308.

In step S1308, the visible digital watermark embedding apparatus determines a region near the embedding target pixel on the basis of the initially set neighboring region selection method NS. The visible digital watermark embedding apparatus analyzes the pixel value in the neighboring region in accordance with the initially set neighboring region analysis method NA, generating a neighboring region analysis value.

In step S1310, an embedding amount ΔY to be added to the embedding target pixel is determined using the embedding amount determination function F_E on the basis of the neighboring region analysis value generated in step S1308, the visible intensity value S, the watermark image shape intensity value IN_A set in step S1318, and the noise generation key RN_K and noise amplitude RN_A input by initial setting. A notation according to the third embodiment is

ΔL=IN_A×(L_SHIFT(S)+RAND(RN_K)×RN_A)

That is, a lightness change amount ΔL is calculated in consideration of the watermark image shape intensity value IN_A serving as a local visible digital watermark intensity, in addition to the visible intensity value S serving as a visible digital watermark intensity in the entire image. The lightness can be changed within the watermark image shape, and a stereoscopic visible watermark image can be embedded in an original image.

In step S1312, the embedding amount ΔY determined in step S1310 is added to the pixel value of the input pixel. In place of simple addition processing, the pixel value is made to fall within the expressible grayscale range after addition in consideration of the case wherein the added pixel value exceeds the expressible grayscale value (for example, the pixel value is less than 0 or 256 or more for an 8-bit grayscale image).

In step S1314, write processing of writing the added pixel value in the output image W is executed. In step S1316, whether all pixels have been processed is determined. If NO in step S1316, processing returns to step S1304 to continue the above-described processing until all pixels have been processed.

The outline of the visible digital watermark embedding apparatus according to the fourth embodiment has been described.

Figure 14:
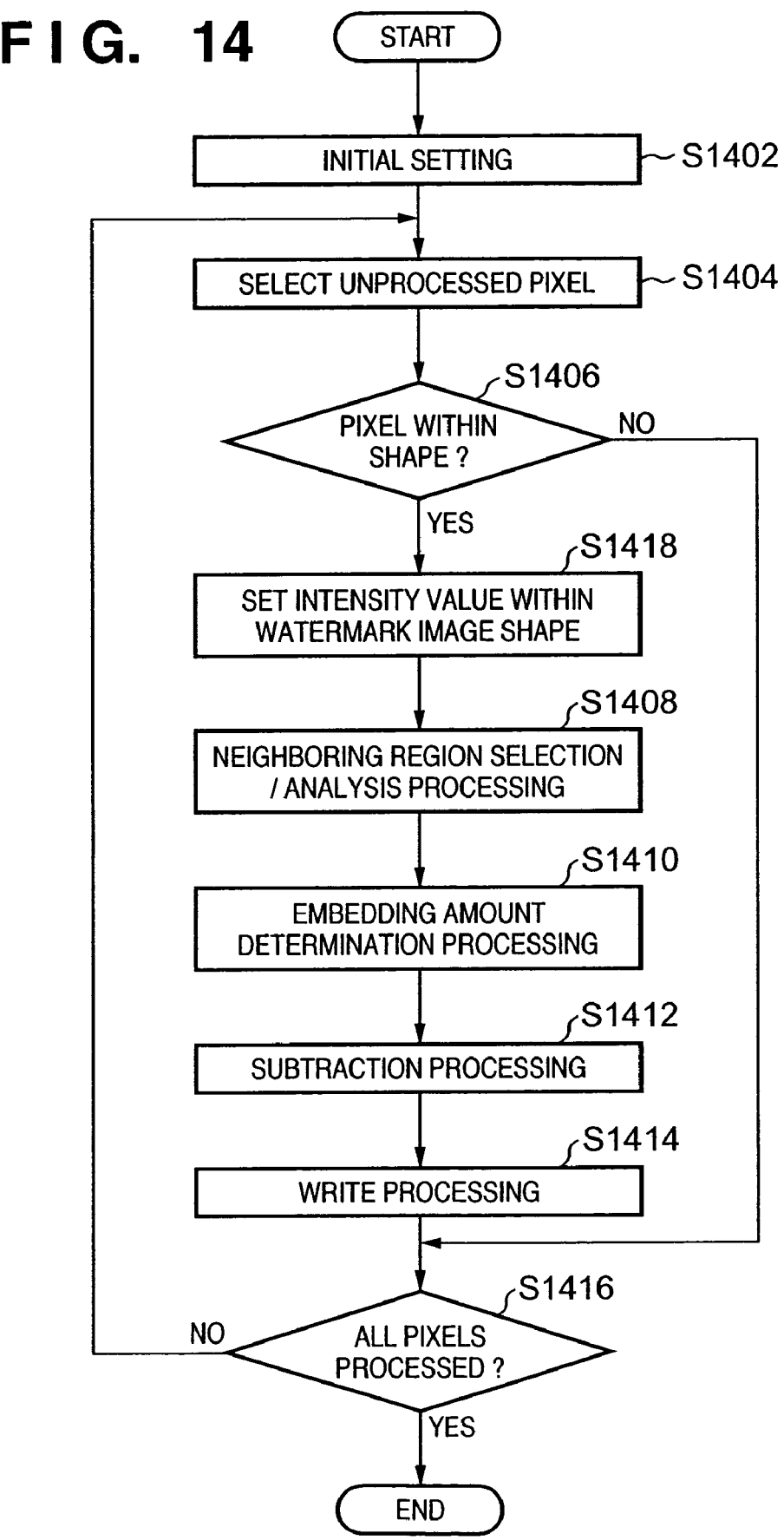
FIG. 14 is a flow chart showing an example of visible digital watermark removal processing according to the third embodiment.

FIG. 14 is a flow chart showing a visible digital watermark removal apparatus according to the fourth embodiment. The visible digital watermark removal apparatus will be described.

In the initial state in step S1402, an original image I comprised of a plurality of pixels each having a pixel position and pixel value, watermark image shape information M comprised of a pixel position representing the shape of an embedded image and a watermark image shape intensity value representing a watermark intensity in a watermark image shape, an embedding amount determination function F_E, a noise generation key RN_K and noise amplitude RN_A for generating noise, a visible intensity value S which defines the intensity of a visible digital watermark, a neighboring pixel selection method NS, and a neighboring pixel analysis method NA are set. An output image W is set equal to the input original image I.

In step S1404, an unprocessed pixel of the input image is selected.

In step S1406, the pixel position of a pixel which constitutes the original image is compared with watermark image shape information. If information at a corresponding position in the watermark image shape information is "0", the pixel is determined not to fall within the watermark image shape, and processing for the pixel ends. If information at the corresponding position in the watermark image shape information is not "0", the pixel is determined to fall within the watermark image shape (noise addition position), and processing advances to step S1418.

In step S1418, the value at the corresponding position in the watermark image shape information is read and set as a watermark image shape intensity value IN_A, and processing advances to step S1408.

In step S1408, the visible digital watermark removal apparatus determines a region near the embedding target pixel on the basis of the initially set neighboring region selection method NS. The visible digital watermark removal apparatus analyzes the pixel value in the neighboring region in accordance with the initially set neighboring region analysis method NA, generating a neighboring region analysis value.

In step S1410, an embedding amount ΔY to be added to the embedding target pixel is determined using the embedding amount determination function F_E on the basis of the neighboring region analysis value generated in step S1408, the visible intensity value S, the watermark image shape intensity value IN_A set in step S1418, and the noise generation key RN_K and noise amplitude RN_A input by initial setting. The embedding amount determination function is the same as that of the embedding apparatus:

ΔL=IN_A×(L_SHIFT(S)+RAND(RN_K)×RN_A)

A lightness change amount ΔL is calculated in consideration of the watermark image shape intensity value IN_A serving as a local visible digital watermark intensity, in addition to the visible intensity value S serving as a visible digital watermark intensity in the entire image.

In step S1412, the embedding amount ΔY determined in step S1410 is subtracted from the pixel value of the input pixel. When the subtracted pixel value exceeds the expressible grayscale, it can be considered that the pixel value has been made to fall within the expressible grayscale range by addition processing. In place of simple subtraction processing, the pixel value is made to fall within the maximum expressible grayscale range (256 grayscale levels for 8 bits).

In the fourth embodiment, as described in the last part of the first embodiment, no embedding need be performed when the added pixel value does not fall within the expressible grayscale range. In this case, to implement a reversible digital watermark, modified watermark image shape information M' in which information not subjected to embedding is reflected on watermark image shape information M may be generated and output as key information.

In step S1414, write processing of writing the subtracted pixel value in the output image W is executed. In step S1416, whether all pixels have been processed is determined. If NO in step S1416, processing returns to step S1404 to continue the above-described processing until all pixels have been processed.

The outline of the visible digital watermark removal apparatus according to the fourth embodiment has been described.

The fourth embodiment can embed a stereoscopic visible watermark by holding a value representing a relative watermark intensity in a watermark image shape at each position of the watermark image shape. Multilevel image shape information in the fourth embodiment has been applied to the second embodiment, and can also be applied to the first embodiment.

Fifth Embodiment

In the above embodiments, noise addition processing is done for each pixel. In the fifth embodiment, reversible noise is added to an image compression-coded by JPEG, JPEG 2000, or the like.

A compression coding method such as JPEG or JPEG 2000 does not define an input color component. In many cases, R (Red), G (Green), and B (Blue) color components are transformed into Y (luminance), Cb (color difference), and Cr (color difference), and then discrete cosine transform or discrete wavelet transform is executed.

A frequency conversion coefficient representing the luminance component of a color image compression-coded by JPEG or JPEG 2000 is used as a visible digital watermark embedding component. Such component can be embedded in a luminance value without any special processing.

In JPEG compression coding, compression coding is performed for each block. For example, a JPEG_compression-coded image has a minimum encoding unit (in general, 8×8 pixels), and basic compression coding processing is done for each unit. To embed a visible digital watermark in a JPEG-compression-coded image, watermark image shape information is set not for each pixel but for the minimum encoding unit. This facilitates applying the method of each embodiment described above.

More specifically, in order to transform an image into frequency component data for each 8×8 pixel block, DCT transform is performed. If the pixel block is not located at a position where noise should be multiplexed, general JPEG encoding is done. If the pixel block is determined to be located at the multiplexing position, the same processing as that in the first to fourth embodiments is executed for bits which constitute a DC component value obtained as a result of DCT transform. At this time, the visible intensity value S is referred to, similar to the first to fourth embodiments. As a neighboring region, a DC component after orthogonal transform of a neighboring pixel block is used. An AC component after DCT transform of a pixel block of interest may be employed as a neighboring region.

Figure 15:
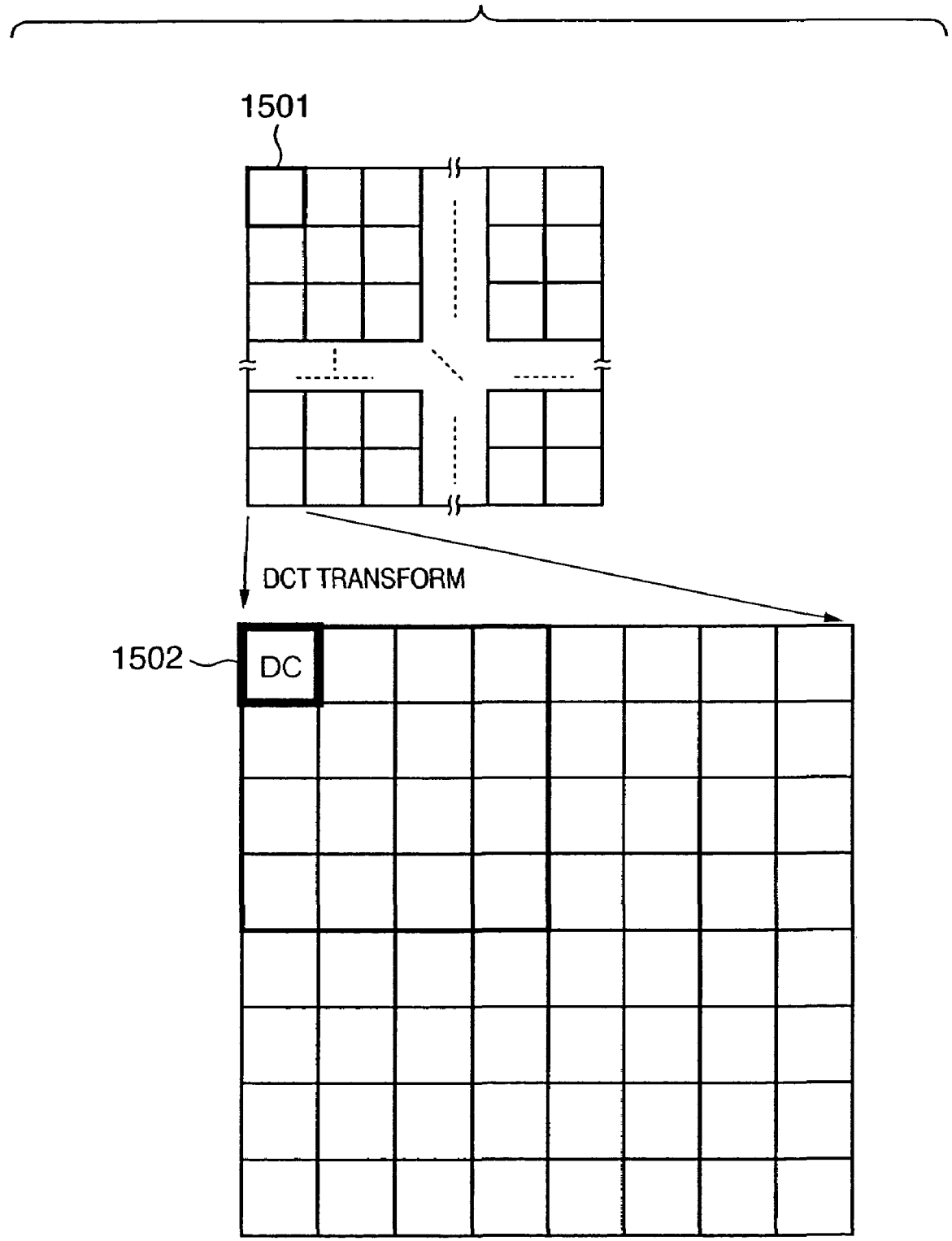
FIG. 15 is a view showing a minimum encoding unit in JPEG compression coding.

In FIG. 15, reference numeral 1501 denotes an image block in the minimum encoding unit in JPEG compression coding. For a JPEG-compression-coded image, DCT (Discrete Cosine Transform) is executed within the minimum encoding unit (1501). Reference numeral 1502 denotes a DC component (average value) of a DCT coefficient obtained for the minimum encoding unit after DCT transform. The remaining 63 coefficients are AC coefficients.

The average value in the minimum encoding unit can be changed by performing arithmetic bit region calculation processing described in the first and third embodiments or addition processing described in the second and fourth embodiments for the DC component of the DC coefficient in the minimum encoding unit. A visible digital watermark can be implemented for each pixel block.

When the fifth embodiment is applied to the second embodiment, the DC component of a pixel block of interest is converted into a lightness. The lightness L is calculated from the DC value of a neighboring pixel block, and the lightness change amount is determined in the above-described way. The lightness change amount is added to the lightness value of the pixel block of interest, and the lightness value is returned to a luminance value.

Assuming that watermark image shape information is information which designates the minimum encoding unit block subjected to embedding, the first to fourth embodiments can be applied. As another merit for these embodiments, image shape information M can be reduced. In JPEG, whether to perform multiplexing for the 8×8 pixel unit is determined. One pixel of image shape information (binary or multilevel) corresponds to 8×8 pixels of an original image (the capacity is reduced to 1/64).

To remove noise, whether a block to be processed undergoes noise embedding is determined on the basis of image shape information before inverse DCT transform. If the pixel is determined not to be subjected to noise embedding, the block is decoded by general processing. If the pixel is determined to be subjected to noise embedding and the fifth embodiment is applied to the first embodiment, an arithmetic bit region at a DC component is obtained (specified) by looking up an arithmetic bit region determination table T determined by the visible intensity value S. An arithmetic bit region is determined from the restored DC component of a neighboring region by looking up the table. Logical calculation (exclusive-OR calculation according to the first embodiment) with a serial bit sequence generated by a random number is performed to reconstruct the image. In JPEG compression coding, data is discarded by quantization processing, and the image cannot be completely reconstructed into an original image. However, also in the fifth embodiment, at least an image from which noise is removed to almost an original image can be obtained at the same quality as a decoding result by general JPEG.

As the neighboring region analysis value (neighboring region characteristic value), DCT coefficients in a plurality of neighboring minimum encoding unit blocks or another DCT coefficient in the minimum encoding unit serving as an embedding target block may be used. An AC coefficient as an AC component in the minimum encoding unit serving as an embedding target block represents the frequency characteristic of the embedding target block, and can be effectively adopted as the neighboring region analysis value (neighboring region characteristic value).

On the other hand, a JPEG 2000-compression-coded image is compression-coded by dividing the image stepwise by the band from a low frequency to a high frequency by using DWT (Discrete Wavelet Transform) while holding image shape information.

Figure 16:
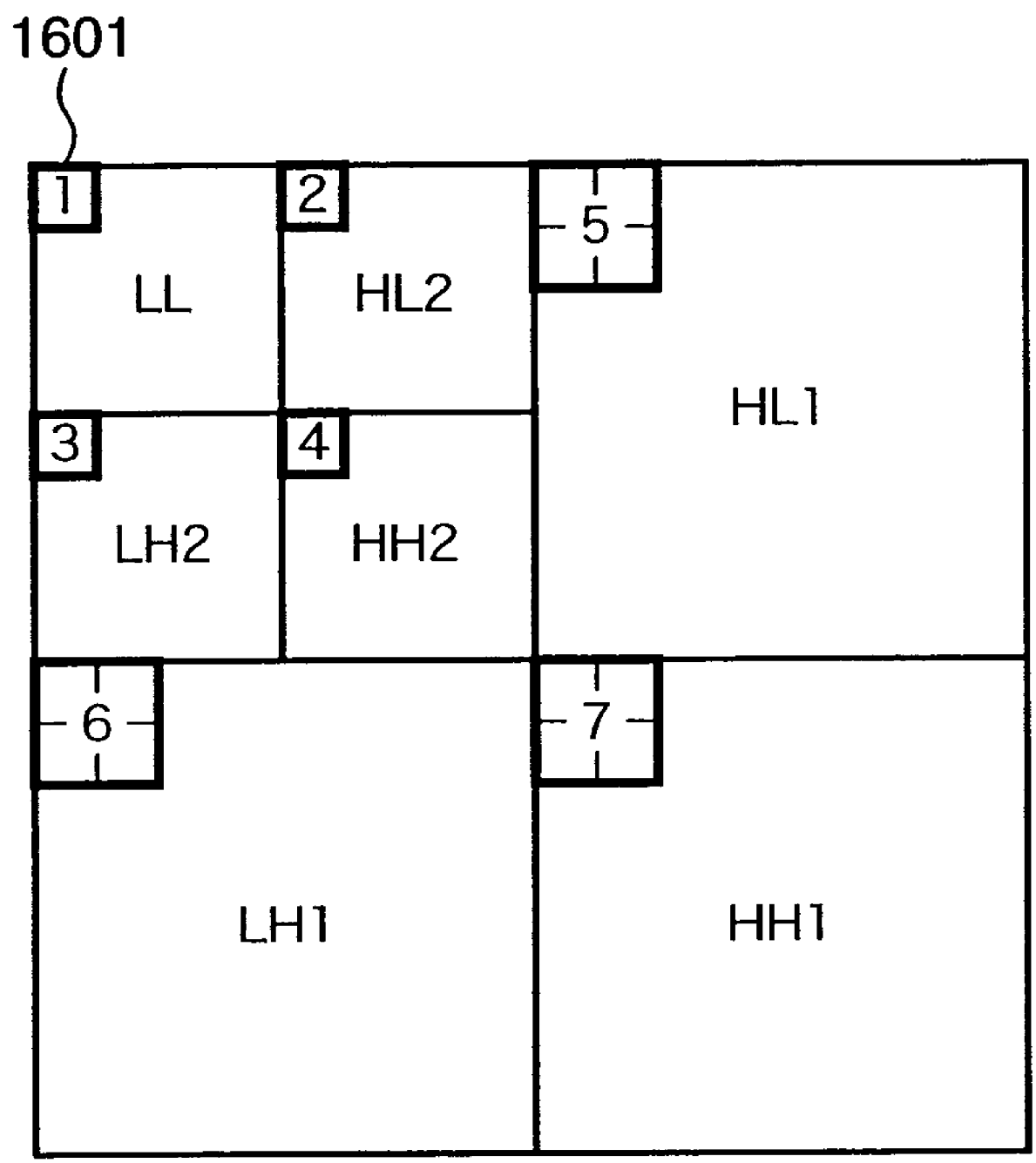
FIG. 16 is a view showing band division by discrete wavelet transform in JPEG 2000 compression coding.

FIG. 16 is a view showing band division by discrete wavelet transform in JPEG 2000 compression coding.

In discrete wavelet transform, low frequency image components which greatly influence an image concentrate on LL, and LL satisfactorily holds the image feature of an original image. If an element used for embedding is the low frequency component (LL) of DWT (Discrete Wavelet Transform), reversible noise can be added relatively similar to the first to fourth embodiments.

To embed noise in the low frequency component (LL) of DWT (Discrete Wavelet Transform), not only the DWT coefficient of neighboring LL but also the DWT coefficients of other subbands (HL2, LH2, HH2, HL1, LH1, and HH1) which constitute a tree structure together with LL may be used as regions corresponding to the second and third neighboring regions. In FIG. 16, DWT coefficients which constitute a tree structure together with DWT coefficient 1 of LL are DWT coefficient 2 (HL2), DWT coefficient 3 (LH2), DWT coefficient 4 (HH2), DWT coefficient 5 (HL1), DWT coefficient 6 (LH1), and DWT coefficient 7 (HH1). The DWT coefficients of other subbands which constitute a tree structure together with a neighboring LL component may be similarly employed as neighboring regions.

Information on the frequency characteristic of an embedding target section in an original image can be obtained from the DWT coefficients of subbands. The DWT coefficients of subbands are effective as a neighboring region characteristic value which determines a visible digital watermark intensity.

When the methods described in the first to fourth embodiments are applied to the DWT (Discrete Wavelet Transform) coefficient of a JPEG 2000-compression-coded image, an arithmetic bit region determination table must be designed in consideration of the fact that the DWT coefficient takes a positive or negative value.

In a JPEG 2000-compression-coded image, a 1-bit bit plane having the same size as the image size is prepared for ROI (Region Of Interest). (A JPEG 2000 basic encoding system shifts up and encodes only ROI.)

When watermark image shape information is to be presented as a watermark image to the image appreciator in the absence of any ROI, the watermark image shape information may be set in ROI.

For example, visible logotype information representing copyright information is described in ROI. In transmitting image information by content delivery, the logotype information can be first presented to the appreciator, explicitly presenting the copyright holder of the content to the user.

Watermark image shape information has been encoded together with an image as ROI information. Key information necessary to remove a visible digital watermark can be reduced.

Watermark image shape information necessary to remove a visible digital watermark can also be attached to a predetermined position such as the header of an image file. Reconstruction of an image containing the visible digital watermark into an original image requires only necessary key information in addition to the image file, reducing the delivered information amount.

A key (and watermark image shape information) necessary to remove a visible digital watermark has a relatively small information amount, and can be attached to a predetermined position such as the header of an image file. In order to enable only a specific user to remove a visible digital watermark, the key (and watermark image shape information) may be encrypted by predetermined cryptography (e.g., public key cryptography), and attached to a predetermined position such as the header of an image file.

The first and third embodiments have described only an exclusive-OR (XOR calculation) as cryptography. The present invention can also adopt secret key cryptography such as DES or public key cryptography by collecting a plurality of arithmetic bit regions into a predetermined processing unit (e.g., 64 bits).

In the first and third embodiments, a neighboring region must have been reconstructed in removing a visible digital watermark from an embedding target pixel. When a region left adjacent to the embedding target pixel is set as a neighboring region, a predetermined number of bits must be collected from the arithmetic bit regions of a plurality of pixels in the vertical direction and encrypted.

In the use of secret key cryptography such as DES belonging to block cryptography of performing processing for each predetermined processing unit, if the number of collected bits does not reach a predetermined processing unit, "0"s or "1"s are padded by a necessary number of bits to satisfy the predetermined unit and then encryption is performed. A bit which cannot be stored at an original pixel position may be attached to a predetermined file position such as a header.

Alternatively, cryptography belonging to stream cryptography (belonging to secret key cryptography) capable of processing for one to several bits may be employed.

In this case, in the first and third embodiments, not a random number key, but a secret key for secret key cryptography, or a public key in embedding and private key in extraction for public key cryptography are input by initial setting.

The fifth embodiment has exemplified DES as cryptography, but may adopt another secret key cryptography such as AES, FEAL, IDEA, RC2, RC4, RC5, MISTY, Caesar cryptography, Viginere cryptography, Beaufort cryptography, Playfair cryptography, Hill cryptography, or Vernam cryptography.

The fifth embodiment has exemplified a still image, but the same principle can also be applied to a moving image. For example, in MPEG compression coding, reversible noise can be relatively easily embedded using an intermediate frame as an embedding target. In Motion JPEG 2000, reversible noise can be repetitively embedded by the same method as that of JPEG 2000 compression coding in the time frame direction. Hence, addition of reversible noise to a moving image also falls within the scope of the present invention.

The present invention has mainly described addition of reversible noise corresponding to the pixel value of an image. A visible digital watermark can also be embedded by adding strong noise to watermark image shape information. Embedding of a visible digital watermark using the above-described method of the present invention also falls within the scope of the present invention.

Images in which visible digital watermarks are embedded will be exemplified for exhibiting the effects of a visible digital watermark in the embodiments of the present invention.

Each image is originally a multilevel grayscale image in which one pixel is comprised of many bits. However, drawings attached to a patent specification provide not multilevel images but only binary images. Each image to be described later is not a noise-multiplexed multilevel grayscale image, but shows a result of binarizing it by error diffusion processing.

Figure 18:
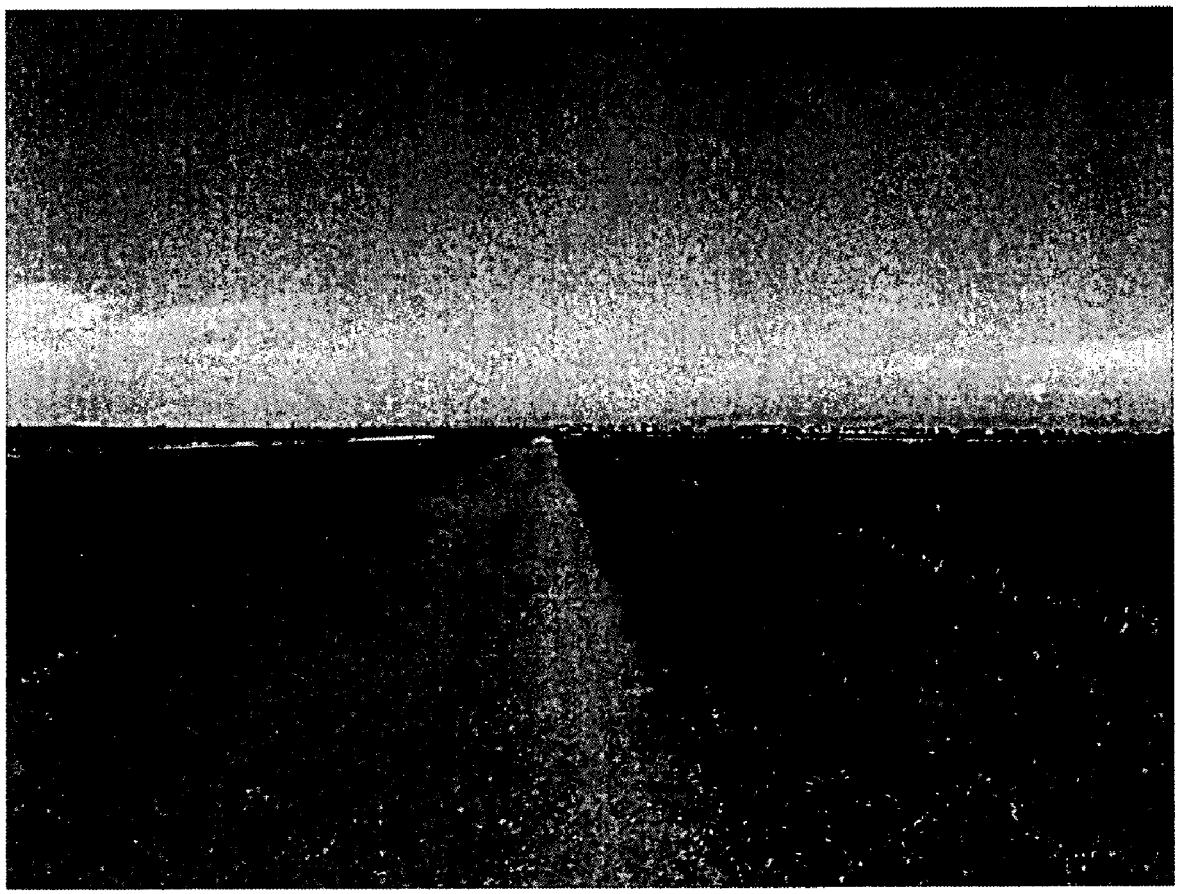
FIG. 18 is a view showing an example of an original image subjected to noise multiplexing.

FIG. 18 shows an original image for generating a visible digital watermark embedding sample according to the present invention. This image is an 8-bit grayscale image of 640 vertical pixels ×480 horizontal pixels.

Figure 19:
FIG. 19 is a view showing a sample image in which a visible digital watermark is embedded by the method of the third embodiment.

FIG. 19 shows an image in which a visible digital watermark in FIG. 17 is embedded by the method of the third embodiment. This image is obtained by determining an arithmetic bit region using, as a neighboring region, a region left adjacent to an embedding target pixel, calculating an XOR between the arithmetic bit region and a serial bit sequence generated from a key depending on an embedding position, and replacing the calculation result. The embedding intensity is $\Delta L\_S=30$.

A visible digital watermark is presented to an image appreciator while the feature of the image is maintained.

FIG. 20 shows an image in which the visible digital watermark in FIG. 17 is embedded by the method of the second embodiment. A region left adjacent to an embedding target pixel is set as a neighboring region at the lightness shift amount $\Delta L\_S=5$, the noise component RN=0, and threshold setting type I (threshold "128"). A visible digital watermark which allows presenting the background through additional information (characters) while maintaining the feature of the original image and can be perceived almost uniformly at any grayscale such as a bright portion or dark portion is implemented.

Figure 21:
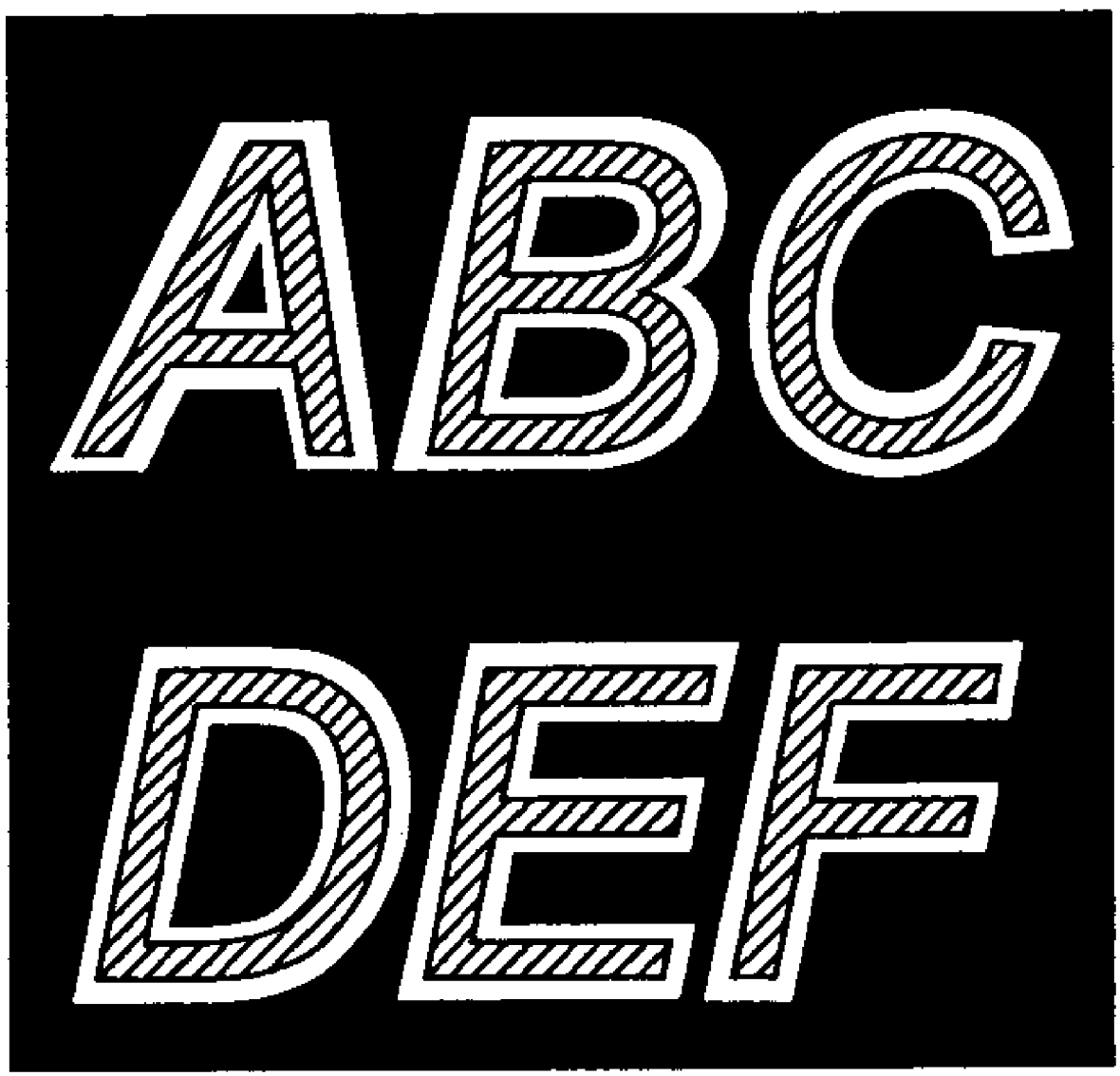
FIG. 21 is a view showing an example of watermark image shape information having a relative intensity within the watermark image shape according to the fourth embodiment.

FIG. 21 shows an image representing watermark image shape information according to the fourth embodiment. Unlike the image in FIG. 17, the image in FIG. 21 has a relative intensity within the watermark image shape.

FIG. 22 shows an image in which the visible digital watermark in FIG. 21 is embedded by the method of the fourth embodiment. A region left adjacent to an embedding target pixel is set as a neighboring region at the lightness shift amount $\Delta L\_S=10$, the noise component RN=0, and threshold setting type I (threshold "128").

Unlike the image in FIG. 20, the visible digital watermark appears stereoscopically.

In FIGS. 18 to 22, a neighboring region characteristic value including a frequency characteristic is not calculated by the neighboring region analysis means, and the visible digital watermark is slightly difficult to see in the high-frequency range. However, it is also possible to adjust an image so as to uniformly present the entire image by increasing/decreasing the lightness shift value or noise component in accordance with the neighboring region characteristic value of the neighboring region analysis value, as described above in the present invention.

The embodiments have been described above. As is apparent from the above description, most of the embodiments can be realized by software. In general, when a computer program is installed into a general-purpose information processing apparatus such as a personal computer, a computer-readable storage medium such as a floppy® disk, CD-ROM, or semiconductor memory card is set in the apparatus to execute an install program or copy the program to the system. Such computer-readable storage medium also falls within the scope of the present invention.

An OS or the like running on the computer performs part or all of processing. Alternatively, program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes. Also in this case, functions equal to those of the embodiments can be realized, the same effects can be obtained, and the objects of the present invention can be achieved.

As described above, according to the embodiments, an input image, watermark image shape information representing the image shape of a watermark image, a key, and a watermark intensity value representing a watermark image intensity are input. Some of the building values of the building elements of the input image or neighboring regions are referred to for the building values of the building elements of the input image at positions within the watermark image shape represented by the watermark image shape information. Calculation based on the key is executed to change the building values. While the feature of the input image is maintained, a high-quality, high-security visible digital watermark can be embedded in an original image, satisfactorily protecting copyrights.

The image containing the visible digital watermark, the watermark image shape information, the key, and the watermark intensity value are input, and calculation reverse to the above calculation is executed. As a result, the digital watermark can be removed to reconstruct the original image.

As has been described above, according to the present invention, noise can be multiplexed to reversibly multiplex visible additional information on a multilevel image. In addition, natural visible additional information can be reversibly multiplexed without impairing the atmosphere of the original image at a portion where the additional information is multiplexed. By removing the additional information, an original image or an image almost identical to the original image can be reconstructed.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which multiplexes noise on a multilevel image data containing at least a luminance component as a main component, thereby embedding visible additional information with a noise-multiplexed distribution, comprising:
   input means for inputting, as the additional information, information representing whether or not to multiplex noise for each pixel;
   determination means for determining on the basis of the additional information whether a pixel of interest in the multilevel image data is located at a position where noise is to be multiplexed;
   luminance value calculation means for, when said determination means determines that the pixel of interest is located at the position where noise is to be multiplexed, calculating an addition luminance value to be added to the pixel of interest on the basis of a luminance value of a neighboring region near the pixel of interest; and
   addition means for adding the calculated addition luminance value to a luminance value of the pixel of interest.

2. The apparatus according to claim 1, wherein said luminance value calculation means comprises
   first conversion means for converting data of the neighboring region into a lightness value,
   change amount calculation means for calculating a lightness change amount for the neighboring region on the basis of key information for multiplexing reversible noise on the pixie of interest and the luminance value of the neighboring region, lightness addition means for adding the calculated lightness change amount to the lightness value converted by said first conversion means, second conversion means for converting the lightness value obtained by said lightness addition means into a luminance value, and means for calculating, as the addition luminance value, a difference between the luminance value obtained by said second conversion means and the luminance value of the neighboring region.

3. The apparatus according to claim 2, wherein said change amount calculation means includes means for determining a sign to be changed on the basis of the luminance or lightness value of the neighboring region.

4. The apparatus according to claim 2, wherein the key information includes intensity information of noise to be embedded, a random number key for generating noise, and a noise amplitude.

5. The apparatus according to claim 1, wherein the information which is input by said input means and represents whether or not to multiplex noise for each pixel includes information expressed by a multilevel value, and when noise is multiplexed, stores a visible intensity level for multiplexing.

6. The apparatus according to claim 1, wherein in a case where a luminance value added by said addition means exceeds an expressible grayscale range, the addition luminance value is not added to a corresponding pixel, and the information representing whether or not to multiplex noise for a position corresponding to the additional information is changed not to multiplex noise.

7. An image processing apparatus which removes visible additional information from multilevel image data in which noise is reversibly embedded to multiplex the visible additional information, comprising:

input means for inputting, as the additional information, information representing whether or not to multiplex noise for each pixel;

determination means for determining on the basis of the additional information whether a pixel of interest in the multilevel image data is located at a position where noise is multiplexed;

addition luminance value calculation means for, when said determination means that the pixel of interest is located at the position where noise is multiplexed, calculating an addition luminance value added to the pixel of interest on the basis of a luminance of a neighboring region near the pixel of interest where removal processing has been completed; and subtraction means for subtracting the calculated luminance value from a luminance value of the pixel of interest.

8. An image processing apparatus which multiplexes noise on multilevel image data comprised of a plurality of color components, thereby embedding visible additional information with a noise-multiplexed distribution, comprising:

input means for inputting, as the additional information, information representing whether or not to multiplex noise for each pixel;

determination means for determining on the basis of the additional information whether a pixel of interest in the multilevel image data is located at a position where noise is to be multiplexed;

addition pixel value calculation means for, when said determination means determines that the pixel of interest is located at the position where noise is to be multiplexed, calculating a addition pixel value to be added to the plurality of color components of the pixel of interest on the basis of a luminance value of a neighboring region near the pixel of interest; and addition means for adding the calculated addition pixel value to a pixel value of the pixel of interest.

9. The apparatus according to claim 8, wherein said addition pixel value calculation means comprises means for calculating a luminance value from a pixel value of the neighboring region, first conversion means for converting the luminance value into lightness value, change amount calculation means for calculating a lightness change amount for the neighboring region on the basis of key information for multiplexing reversible noise on the pixel of interest and the luminance value of the neighboring region, lightness addition means for adding the calculated lightness change amount to the lightness value converted by said first conversion means, second conversion means for converting the lightness value obtained by said lightness addition means into a luminance value, third conversion means for converting the luminance value obtained by said second conversion means into a plurality of pixel values, and means for calculating, as the addition pixel value, a difference between the pixel value obtained by said third conversion means and the pixel value of the neighboring region.

10. An image processing apparatus which removes visible additional information from multilevel image data in which noise is reversibly embedded to multiplex the visible additional information, comprising:

input means for inputting, as the additional information, information representing whether or not to multiplex noise for each pixel;

determination means for determining on the basis of the additional information whether a pixel of interest in the multilevel image data is located at a position where noise is multiplexed;

addition pixel value calculation means for, when said determination means determines that the pixel of interest is located at the position where noise is multiplexed, calculating an addition pixel value added to the pixel of interest on the basis of a luminance of a neighboring region near the pixel of interest where removal processing has been completed; and subtraction means for subtracting the calculated pixel value from a pixel value of the pixel of interest.

11. An image processing method of multiplexing noise on multilevel image data containing at least a luminance component as a main component, thereby embedding visible additional information with a noise-multiplexed distribution, comprising:

an input step of inputting, as the additional information, information representing whether or not to multiplex noise for each pixel;

a determination step of determining on the basis of the of the additional information whether a pixel of interest in the multilevel image data is located at a position where noise is to be multiplexed;

a luminance value calculation step of, when the pixel of interest is determined in the determination step to be located at the position where noise is to be multiplexed, calculating an addition luminance value to be added to the pixel of interest on the basis of a luminance value of a neighboring region near the pixel of interest; and an addition step of adding the calculated addition luminance value to a luminance value of the pixel of interest.

12. An image processing method of removing visible additional information from multilevel image data in which noise is reversibly embedded to multiplex the visible additional information, comprising:

an input step of inputting, as the additional information, information representing whether or not to multiplex noise for each pixel;

a determination step of determining on the basis of the additional information whether a pixel of interest in the multilevel image data is located at a position where noise is multiplexed;

an addition luminance value calculation step of, when the pixel of interest is determined in the determination step to be located at the position where noise is multiplexed, calculating an addition luminance value added to the pixel of interest on the basis of a luminance of a neighboring region near the pixel of interest where removal processing has been completed; and a subtraction step of subtracting the calculated luminance value from a luminance value of the pixel of interest.

13. An image processing method of multiplexing noise on multilevel image data comprised of a plurality of color components, thereby embedding visible additional information with a noise-multiplexed distribution, comprising:

an input step of inputting, as the additional information, information representing whether or not to multiplex noise for each pixel;

a determination step of determining on the basis of the additional information whether a pixel of interest in the multilevel image data is located at a position where noise is to be multiplexed;

an addition pixel value calculation step of, when the pixel of interest is determined in the determination step to be located at the position where noise is to be multiplexed, calculating an addition pixel value to be added to the plurality of color components of the pixel of interest on the basis of a luminance value of a neighboring region near the pixel of interest; and an addition step of adding the calculated addition pixel value to a pixel value of the pixel of interest.

14. An image processing method of removing visible additional information from multilevel image data in which noise is reversibly embedded to multiplex the visible additional information, comprising:

an input step of inputting, as the additional information, information representing whether or not to multiplex noise for each pixel;

a determination step of determining on the basis of the additional information whether a pixel of interest in the multilevel image data is located at a position where noise is multiplexed;

an additional pixel value calculation step of, when the pixel of interest is determined in the determination step to be located a the position where noise is multiplexed, calculating an addition pixel value added to the pixel of interest on the basis of a luminance of a neighboring region near the pixel of interest where removal processing has been completed; and a subtraction step of subtracting the calculated pixel value from a pixel value of the pixel of interest.

15. A computer program embodied in a computer-readable medium functioning as an image processing apparatus which multiplexes noise on multilevel image data containing at least a luminance component as a main component, thereby embedding visible additional information with a noise-multiplexed distribution, functioning as:

input means for inputting, as the additional information, information representing whether or not to multiplex noise for each pixel;

determination means for determining on the basis of the additional information whether a pixel of interest in the multilevel image data is located at a position where noise is to be multiplexed;

luminance value calculation means for, when said determination means determines that the pixel of interest is located at the position where noise is to be multiplexed, calculating an addition luminance value to be added to the pixel of interest on the basis of a luminance value of a neighboring region near the pixel of interest; and addition means for adding the calculated addition luminance value to a luminance value of the pixel of interest.

16. A computer-readable storage medium storing a computer program defined in claim 15.

17. A computer program embodied in a computer-readable medium functioning as an image processing apparatus which removes visible additional information from multilevel image data in which noise is reversibly embedded to multiplex the visible additional information, functioning as:

input means for inputting, as the additional information, information representing whether or not to multiplex noise for each pixel;

determination means for determining on the basis of the additional information whether a pixel of interest in the multilevel image data is located at a position where noise is multiplexed;

addition luminance value calculation means for, when said determination means determines that the pixel of interest is located at the position where noise is multiplexed, calculating an addition luminance value added to the pixel of interest on the basis of a luminance of a neighboring region near the pixel of interest where removal processing has been completed; and subtraction means for subtracting the calculated luminance value form a luminance value of the pixel of interest.

18. A computer-readable storage medium storing a computer program defined in claim 17.

19. A computer program embodied in a computer-readable medium functioning as an image processing apparatus which multiplexes noise on multilevel image data comprised of a plurality of color components, thereby embedding visible additional information with a noise-multiplexed distribution, functioning as:

input means for inputting, as the additional information, information representing whether or not to multiplex noise for each pixel;

determination means for determining on the basis of the additional information whether a pixel of interest in the multilevel image data is located at a position where noise is to be multiplexed;

addition pixel value calculation means for, when said determination means determines that the pixel of interest is located at the position where noise is to be multiplexed, calculating an addition pixel value to be added to the plurality of color components of the pixel of interest on the basis of a luminance value of a neighboring region near the pixel of interest; and addition means for adding the calculated addition pixel value to a pixel value of the pixel of interest.

20. A computer-readable storage medium storing a computer program defined in claim 19.

21. A computer program embodied in a computer-readable medium functioning as an image processing apparatus which removes visible additional information from multilevel image data in which noise is reversibly embedded to multiplex the visible additional information, functioning as:

input means for inputting, as the additional information, information representing whether or not to multiplex noise for each pixel;

determination means for determining on the basis of the additional information whether a pixel of interest in the multilevel image data is located at a position where noise is multiplexed;

addition pixel value calculation means for, when said determination means determines that the pixel of interest is located at the position where noise is multiplexed, calculating an additional pixel value added to the pixel of interest on the basis of a luminance of a neighboring region near the pixel of interest where removal processing has been completed; and subtraction means for subtracting the calculated pixel value from a pixel of the pixel o interest.

22. A computer-readable storage medium storing a computer program defined in claim 21.

23. An image processing apparatus which converts multilevel image data containing at least a luminance component as a main component into frequency component data for each pixel block of a predetermined size to compression-code the multilevel image data, and multiplexes noise on the multilevel image to embed visible additional information with a noise-multiplexed distribution, comprising:

input means for inputting, as the additional information, information representing whether or not to multiplex noise for each pixel block of the predetermined size;

determination means for determining on the basis of the additional information whether a pixel block of interest in the multilevel image data is located at a position where noise is to be multiplexed;

luminance value calculation means for, when said determination means determines that the pixel block of interest is located at the position where noise is to be multiplexed, referring to a pixel block near the pixel block of interest and calculating an addition luminance value to be added to a low frequency component of the block of interest; and addition means for adding the calculated addition luminance value to a luminance value of the low frequency component of the pixel block of interest.

24. An image processing apparatus which removes visible additional information from multilevel image data in which noise is reversibly embedded to multiplex the visible additional information, comprising:

input means for inputting, as the additional information, information representing whether or not to multiplex noise for each pixel block of a predetermined size;

determination means for determining on the basis of the additional information whether a pixel block of interest in the multilevel image data is located at a position where noise is multiplexed;

luminance value calculation means for, when said determination means determines that the pixel block of interest is located at the position where noise is multiplexed, referring to a pixel block near the pixel block of interest and calculating an addition luminance value added to a low frequency component of the block of interest; and reconstruction means for subtracting the calculated addition luminance value from the low frequency component of the pixel block of interest, thereby reconstructing a state before multiplexing.

25. An image processing method of converting multilevel image data containing at least a luminance component as a main component into frequency component data for each pixel block of a predetermined size to compression-code the multilevel image data, and multiplexing noise on the multilevel image to embed visible additional information with a noise-multiplexed distribution, comprising:

an input step of inputting, as the additional information, information representing whether or not to multiplex noise for each pixel block of the predetermined size;

a determination step of determining on the basis of the additional information whether a pixel block of interest in the multilevel image data is located at a position where noise is to be multiplexed;

a luminance value calculation step of, when the pixel block of interest is determined in the determination step to be located at the position where noise is to be multiplexed, referring to a pixel block near the pixel block of interest and calculating an addition luminance value to be added to a low frequency component of the block of interest; and an addition step of adding the calculated addition luminance value to a luminance value of the low frequency component of the pixel block of interest.

26. An image processing method of removing visible additional information from multilevel image data in which noise is reversibly embedded to multiplex the visible additional information, comprising:

an input step of inputting, as the additional information, information representing whether or not to multiplex noise for each pixel block of a predetermined size;

a determination step of determining on the basis of the additional information whether a pixel block of interest in the multilevel image data is located at a position where noise is multiplexed;

a luminance value calculation step of, when the pixel block of interest is determined in the determination step to be located at the position where noise is multiplexed, referring to a pixel block near the pixel block of interest and calculating an addition luminance value added to a low frequency component of the block of interest; and a reconstruction step of subtracting the calculated addition luminance value from the low frequency reconstructing a state before multiplexing.

27. A computer program embodied in a computer-readable medium functioning as an image processing apparatus which converts multilevel image data containing at least a luminance component as a main component into frequency component data for each pixel block of a predetermined size to compression-code the multilevel image data, and multiplexes noise on the multilevel image to embed visible additional information with a noise-multiplexed distribution, functioning as:

input means for inputting, as the additional information, information representing whether or not to multiplex noise for each pixel block of the predetermined size;

determination means for determining on the basis of the additional information whether a pixel block of interest is located at the position where noise is to be multiplexed;

luminance value calculation means for, when said determination means determines that the pixel block of interest is located at the position where noise is to be multiplexed, referring to a pixel block near the pixel block of interest and calculating an addition luminance value to be added to a low frequency component of the block of interest; and addition means for adding the calculated addition luminance value to a luminance value of the low frequency component of the pixel block of interest.

28. A computer-readable storage medium storing a computer program defined in claim 27.

29. A computer program embodied in a computer-readable medium functioning as an image processing apparatus which removes visible additional information from multilevel image data in which noise is reversibly embedded to multiplex the visible additional information, functioning as:

input means for inputting, as the additional information, information representing whether or not to multiplex noise for each pixel block of a predetermined size;

determination means for determining on the basis of the additional information whether a pixel block of interest in the multilevel image data is located at a position where noise is multiplexed;

luminance value calculation means for, when said determination means determines that the pixel block of interest is located at the position where noise is multiplexed, referring to a pixel block near the pixel block of interest and calculating an addition luminance value added to a low frequency component of the block of interest; and reconstruction means for subtracting the calculated addition luminance value from the low frequency component of the pixel block of interest, thereby reconstructing a state before multiplexing.

30. A computer-readable storage medium storing a computer program defined in claim 29.

31. An image processing apparatus which multiplexes noise on multilevel image data to embed visible additional information with a noise-multiplexed distribution, comprising:

input means for inputting, as the additional information, information representing whether or not to multiplex noise for each pixel;

determination means for determining on the basis of the additional information whether a pixel of interest in the multilevel image data is located at a position where noise is to be multiplexed;

addition pixel value calculation means for, when said determination means determines that the pixel of interest is located at the position where noise is to be multiplexed, calculating an addition pixel value to be added to the pixel of interest;

addition means for adding the calculated addition pixel value to a pixel value of the pixel of interest;

discrimination means for discriminating whether the added pixel value exceeds a predetermined range; and additional information change means for, when said discrimination means discriminates that the added pixel value exceeds the predetermined range, replacing the added pixel value with the pixel value of the pixel of interest, and replacing information representing that noise at a position corresponding to the additional information is to be multiplexed into information representing that noise is not multiplexed.

32. An image processing method of multiplexing noise on multilevel image data to embed visible additional information with a noise-multiplexed distribution, comprising:

an input step of inputting, as the additional information, information representing whether or not to multiplex noise for each pixel;

a determination step of determining on the basis of the additional information whether a pixel of interest in the multilevel image data is located at a position where noise is to be multiplexed;

an addition pixel value calculation step of, when the pixel of interest is determined in the determination step to be located at the position where noise is to be multiplexed, calculating an addition pixel value to be added to the pixel of interest;

an addition step of adding the calculated addition pixel value to a pixel value of the pixel of interest;

a discrimination step of discriminating whether the added pixel value exceeds a predetermined range; and an additional information change step of, when the added pixel value is discriminated in the discrimination step to exceed the predetermined range, replacing the added pixel value with the pixel value of the pixel of interest, and replacing information representing that noise at a position corresponding to the additional information is to be multiplexed into information representing that noise is not multiplexed.

33. A computer program embodied in a computer-readable medium functioning as an image processing apparatus which multiplexes noise on multilevel image data to embed visible additional information with a noise-multiplexed distribution, functioning as:

input means for inputting, as the additional information, information representing whether or not to multiplex noise for each pixel;

determination means for determining on the basis of the additional information whether a pixel of interest in the multilevel image data is located at a position where noise is to be multiplexed;

addition pixel value calculation means for, when said determination means determines that the pixel of interest is located at the position where noise is to be multiplexed, calculating an addition pixel value to be added to the pixel of interest;

addition means for adding the calculated addition pixel value to a pixel value of the pixel of interest;

discrimination means for discriminating whether the added pixel value exceeds a predetermined range; and additional information change means for, when said discrimination means discriminates that the added pixel value exceeds the predetermined range, replacing the added pixel value with the pixel value of the pixel of interest, and replacing information representing that noise at a position corresponding to the additional information is to be multiplexed into information representing that noise is not multiplexed.

34. A computer-readable storage medium storing a computer program defined in claim 33.

* * * * *

UNITED STATES PATENT AND TRADEMARK OFFICE
CERTIFICATE OF CORRECTION

PATENT NO. : 7,197,162 B2
APPLICATION NO. : 10/600582
DATED : March 27, 2007
INVENTOR(S) : Tomochika Murakami It is certified that error appears in the above-identified patent and that said Letters Patent is hereby corrected as shown below:

Col. 2, line 46, after "comprises" insert --:--.

Col. 18, line 4, after "determination" delete "-".

Col. 23, line 28, "s810" should read --S810--.

Col. 34, line 41, delete "a", first occurrence.

line 63, after "comprises" insert --:--.

Col. 35, line 2, "pixie" should read --pixel--.

line 47, after "means" insert --determines--.

Col. 36, line 4, "a" should read --an--.

line 11, after "comprises" insert --:--.

line 15, "lightness" should read --a lightness--.

line 62, after "basis" delete "of the".

Col. 37, line 59, "additional" should read --addition--.

line 61, "a" should read --at--.

Col. 38, line 45, "form" should read --from--.

Col. 39, line 27, "o" should read --of--.

UNITED STATES PATENT AND TRADEMARK OFFICE
CERTIFICATE OF CORRECTION

PATENT NO. : 7,197,162 B2
APPLICATION NO. : 10/600582
DATED : March 27, 2007
INVENTOR(S) : Tomochika Murakami It is certified that error appears in the above-identified patent and that said Letters Patent is hereby corrected as shown below:

Col. 40, line 53, after "frequency" insert --component of the pixel block of interest, thereby--.

Signed and Sealed this

Third Day of June, 2008

JON W. DUDAS
*Director of the United States Patent and Trademark Office*